US009773381B2

(12) United States Patent
DeWaal et al.

(10) Patent No.: US 9,773,381 B2
(45) Date of Patent: Sep. 26, 2017

(54) GAMING SYSTEM, GAMING DEVICE AND METHOD FOR PROVIDING GROUP EVENT WITH INDIVIDUAL GROUP EVENT ELIGIBILITY TIMERS

(75) Inventors: Daniel J. DeWaal, Las Vegas, NV (US); Glen Keith Russell, North Las Vegas, NV (US); Alexandria Estella Ponte Sutich, Reno, NV (US); Anthony J. Baerlocher, Reno, NV (US); David H. Muir, Sr., Warnesbay (AU)

(73) Assignee: IGT, Las Vegas, NV (US)

( * ) Notice: Subject to any disclaimer, the term of this patent is extended or adjusted under 35 U.S.C. 154(b) by 813 days.

(21) Appl. No.: 13/287,771

(22) Filed: Nov. 2, 2011

(65) Prior Publication Data

US 2012/0046112 A1 Feb. 23, 2012

Related U.S. Application Data

(62) Division of application No. 12/268,849, filed on Nov. 11, 2008, now Pat. No. 8,070,593.

(51) Int. Cl.
*G09B 5/04* (2006.01)
*G07F 17/32* (2006.01)

(52) U.S. Cl.
CPC ...... *G07F 17/3274* (2013.01); *G07F 17/3227* (2013.01)

(58) Field of Classification Search
CPC .................................................. G07F 17/3274
(Continued)

(56) References Cited

U.S. PATENT DOCUMENTS 5,116,055 A 5/1992 Tracy
5,344,144 A 9/1994 Canon
5,417,430 A 5/1995 Breeding
5,564,700 A 10/1996 Celona
5,664,998 A 9/1997 Seelig et al.
5,681,040 A 10/1997 Peterson
(Continued)

FOREIGN PATENT DOCUMENTS

JP 2004-229846 A 8/2004
JP 2004-229848 A 8/2004
(Continued)

OTHER PUBLICATIONS

Third Party Submission in Published Application Under 37 C.F.R. 1.99 filed for U.S. Appl. No. 13/287,777, dated Apr. 20, 2012 (2 pages).
JP 2004-229846A and English translation of the Abstract and paragraphs [0011], [0012], & [0079] of same submitted with Third Party Submission in Published Application Under 37 C.F.R. § 1.99 for U.S. Appl. No. 13/287,777 (7 pages).
(Continued)

*Primary Examiner* — Michael Grant
(74) *Attorney, Agent, or Firm* — Neal, Gerber & Eisenberg LLP

(57) ABSTRACT

A gaming system and method which provides a community group event to a plurality of players at a plurality of the gaming devices in the gaming system. Each gaming device participating in the group event is associated with an individual group event eligibility timer. Such individual group event eligibility timers regularly decrement based on time and may increment based on one or more aspects of the player's gaming experience, such as wagers placed. If the individual group event eligibility timer associated with a gaming device participating in the group event lapses before the conclusion of a group event timer or mode, that gaming device is eliminated from the group event. Upon the conclusion of the group event, a group event award is shared amongst the players at the remaining or non-eliminated gaming devices (i.e., the gaming devices associated with individual group event eligibility timers with any amount of remaining time).

10 Claims, 16 Drawing Sheets

(58) Field of Classification Search
USPC .......................................................... 463/20
See application file for complete search history.

(56) References Cited

U.S. PATENT DOCUMENTS

| | | | | |
|---|---|---|---|---|
| 5,752,882 | A | 5/1998 | Acres | |
| 6,089,980 | A | 7/2000 | Gauselmann | |
| 6,146,273 | A | 11/2000 | Olsen | |
| 6,231,445 | B1 | 5/2001 | Acres | |
| 6,364,768 | B1 | 4/2002 | Acres et al. | |
| 6,375,569 | B1 | 4/2002 | Acres | |
| 6,607,438 | B2 | 8/2003 | Baerlocher et al. | |
| 6,726,563 | B1 | 4/2004 | Baerlocher et al. | |
| 6,733,390 | B2 * | 5/2004 | Walker et al. | 463/23 |
| 6,780,105 | B1 | 8/2004 | Kaminkow | |
| 6,814,664 | B2 | 11/2004 | Baerlocher et al. | |
| 6,887,154 | B1 | 5/2005 | Luciano, Jr. et al. | |
| 6,899,625 | B2 | 5/2005 | Luciano, Jr. et al. | |
| 7,033,270 | B2 | 4/2006 | Baerlocher et al. | |
| 7,086,950 | B2 | 8/2006 | Gordon et al. | |
| 7,121,943 | B2 | 10/2006 | Webb et al. | |
| 7,223,172 | B2 | 5/2007 | Baerlocher et al. | |
| 7,311,598 | B2 | 12/2007 | Kaminkow et al. | |
| 7,311,604 | B2 | 12/2007 | Kaminkow et al. | |
| 7,351,140 | B2 | 4/2008 | Wolf et al. | |
| 7,364,510 | B2 | 4/2008 | Walker et al. | |
| 7,427,236 | B2 | 9/2008 | Kaminkow et al. | |
| 7,448,949 | B2 | 11/2008 | Kaminkow et al. | |
| 7,452,270 | B2 | 11/2008 | Walker et al. | |
| 7,470,187 | B2 | 12/2008 | Baerlocher et al. | |
| 7,470,188 | B2 | 12/2008 | Baerlocher et al. | |
| 7,470,189 | B2 | 12/2008 | Baerlocher et al. | |
| 7,470,190 | B2 | 12/2008 | Baerlocher et al. | |
| 7,481,430 | B1 | 1/2009 | Jackson et al. | |
| 7,785,194 | B2 | 8/2010 | Schneider et al. | |
| 2001/0034260 | A1 | 10/2001 | Luciano, Jr. et al. | |
| 2003/0100361 | A1 * | 5/2003 | Sharpless et al. | 463/25 |
| 2003/0186733 | A1 | 10/2003 | Wolf et al. | |
| 2004/0102238 | A1 | 5/2004 | Taylor | |
| 2005/0043082 | A1 | 2/2005 | Peterson et al. | |
| 2005/0187014 | A1 | 8/2005 | Saffari et al. | |
| 2005/0218590 | A1 | 10/2005 | O'Halloran et al. | |
| 2006/0025195 | A1 | 2/2006 | Pennington et al. | |
| 2006/0025203 | A1 | 2/2006 | Thomas | |
| 2006/0040723 | A1 | 2/2006 | Baerlocher et al. | |
| 2006/0040732 | A1 | 2/2006 | Baerlocher et al. | |
| 2006/0040733 | A1 | 2/2006 | Baerlocher et al. | |
| 2006/0040734 | A1 | 2/2006 | Baerlocher et al. | |
| 2006/0040736 | A1 * | 2/2006 | Baerlocher et al. | 463/27 |
| 2006/0046821 | A1 | 3/2006 | Kaminkow et al. | |
| 2006/0068876 | A1 | 3/2006 | Kane et al. | |
| 2006/0073897 | A1 * | 4/2006 | Englman et al. | 463/42 |
| 2006/0100019 | A1 | 5/2006 | Hornik et al. | |
| 2006/0111170 | A1 * | 5/2006 | Hornik et al. | 463/16 |
| 2006/0111178 | A1 | 5/2006 | Gallaway et al. | |
| 2006/0135243 | A1 | 6/2006 | Englman et al. | |
| 2006/0189376 | A1 | 8/2006 | Hornik et al. | |
| 2006/0252481 | A1 | 11/2006 | Schmit | |
| 2006/0287043 | A1 | 12/2006 | Englman et al. | |
| 2007/0054732 | A1 | 3/2007 | Baerlocher | |
| 2007/0054733 | A1 | 3/2007 | Baerlocher et al. | |
| 2007/0060317 | A1 | 3/2007 | Martin | |
| 2007/0060329 | A1 | 3/2007 | Martin | |
| 2007/0060330 | A1 | 3/2007 | Martin | |
| 2007/0060369 | A1 | 3/2007 | Martin | |
| 2007/0077990 | A1 | 4/2007 | Cuddy et al. | |
| 2007/0105619 | A1 | 5/2007 | Kniestead et al. | |
| 2007/0105620 | A1 | 5/2007 | Cuddy et al. | |
| 2007/0123341 | A1 * | 5/2007 | Tessmer et al. | 463/16 |
| 2007/0149292 | A1 | 6/2007 | Kaminkow et al. | |
| 2007/0155465 | A1 | 7/2007 | Walker et al. | |
| 2007/0155485 | A1 * | 7/2007 | Cuddy | G07F 17/3244 463/25 |
| 2007/0167217 | A1 | 7/2007 | Macvittie et al. | |
| 2008/0020817 | A1 | 1/2008 | Kaminkow et al. | |
| 2008/0020822 | A1 | 1/2008 | Cuddy et al. | |
| 2008/0020823 | A1 | 1/2008 | Cuddy et al. | |
| 2008/0020824 | A1 | 1/2008 | Cuddy et al. | |
| 2008/0020825 | A1 | 1/2008 | Cuddy et al. | |
| 2008/0020829 | A1 | 1/2008 | Baerlocher | |
| 2008/0020847 | A1 | 1/2008 | Kniesteadt et al. | |
| 2008/0039194 | A1 | 2/2008 | Walther et al. | |
| 2008/0045341 | A1 | 2/2008 | Englman | |
| 2008/0051168 | A1 | 2/2008 | Kaminkow et al. | |
| 2008/0070676 | A1 | 3/2008 | Baerlocher et al. | |
| 2008/0070677 | A1 | 3/2008 | Baerlocher et al. | |
| 2008/0070678 | A1 | 3/2008 | Baerlocher et al. | |
| 2008/0070702 | A1 | 3/2008 | Kaminkow et al. | |
| 2008/0081690 | A1 | 4/2008 | Baerlocher et al. | |
| 2008/0081691 | A1 | 4/2008 | Baerlocher et al. | |
| 2008/0102916 | A1 | 5/2008 | Kovacs et al. | |
| 2008/0102920 | A1 | 5/2008 | Baerlocher et al. | |
| 2008/0108401 | A1 | 5/2008 | Baerlocher et al. | |
| 2008/0108429 | A1 | 5/2008 | Davis et al. | |
| 2008/0113765 | A1 | 5/2008 | DeWaal | |
| 2008/0113768 | A1 | 5/2008 | Baerlocher | |
| 2008/0113771 | A1 | 5/2008 | Baerlocher et al. | |
| 2008/0119283 | A1 | 5/2008 | Baerlocher | |
| 2008/0139274 | A1 | 6/2008 | Baerlocher et al. | |
| 2008/0139290 | A1 | 6/2008 | Kniesteadt et al. | |
| 2008/0153564 | A1 | 6/2008 | Baerlocher et al. | |
| 2008/0161105 | A1 * | 7/2008 | Mishra | 463/27 |
| 2008/0176650 | A1 | 7/2008 | Wolf et al. | |
| 2008/0188296 | A1 | 8/2008 | Seelig et al. | |
| 2008/0188298 | A1 | 8/2008 | Seelig et al. | |
| 2008/0200239 | A1 | 8/2008 | Gilmore et al. | |
| 2008/0274796 | A1 * | 11/2008 | Lube | 463/25 |
| 2008/0293481 | A1 | 11/2008 | Davies | |
| 2009/0036202 | A1 | 2/2009 | Baerlocher et al. | |
| 2009/0042644 | A1 | 2/2009 | Zielinski | |
| 2009/0042645 | A1 | 2/2009 | Graham et al. | |
| 2009/0275410 | A1 * | 11/2009 | Kisenwether et al. | 463/42 |
| 2010/0069149 | A1 * | 3/2010 | Kisenwether et al. | 463/26 |
| 2010/0255896 | A1 * | 10/2010 | Walther et al. | 463/16 |
| 2011/0130192 | A1 * | 6/2011 | Englman et al. | 463/20 |

FOREIGN PATENT DOCUMENTS

| | | |
|---|---|---|
| WO | WO 2005/082480 | 9/2005 |
| WO | WO 2006/005073 | 1/2006 |
| WO | WO 2007/030733 | 3/2007 |
| WO | WO 2007/033000 | 3/2007 |
| WO | WO 2007/040674 | 4/2007 |
| WO | WO 2007/127259 | 11/2007 |
| WO | WO 2008/021449 | 2/2008 |
| WO | WO 2008/024330 | 2/2008 |
| WO | WO 2008/045398 | 4/2008 |
| WO | WO 2008/048634 | 4/2008 |
| WO | WO 2008/051796 | 5/2008 |
| WO | WO 2008/060978 | 5/2008 |

OTHER PUBLICATIONS

JP 2004-229848A and English translation of the Abstract and paragraphs [0008], [0010], [0011], & [0012] of same submitted with Third Party Submission in Published Application Under 37 C.F.R. § 1.99 for U.S. Appl. No. 13/287,777 (5 pages).

Third Party Submission in Published Application Under 37 C.F.R. 1.99 filed for U.S. Appl. No. 13/287,777, dated Apr. 23, 2012 (2 pages).

JP 2004-229846A and English translation of the Abstract and paragraphs [0011], [0012], & [0079] of same submitted with Third Party Submission in Published Application Under 37 C.F.R. § 1.99 for U.S. Appl. No. 13/287,777 (6 pages).

* cited by examiner

GAMING SYSTEM, GAMING DEVICE AND METHOD FOR PROVIDING GROUP EVENT WITH INDIVIDUAL GROUP EVENT ELIGIBILITY TIMERS

PRIORITY CLAIM

This application is a divisional of, claims priority to and the benefit of U.S. patent application Ser. No. 12/268,849, filed on Nov. 11, 2008, the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known secondary or bonus games include a group gaming aspect wherein a plurality of players participate in a group event for one or more bonus awards. These group events often include a plurality of players that are classified as actively playing eligible gaming machines in the gaming system. However, as certain players frequently keep their level of game play at the minimum amount required to remain classified as actively playing an eligible gaming machine, participation in the group event often does not correspond with each of the multiple player's respective level of play. Accordingly, there is a need to provide a gaming system with a group event, wherein each player's probability of participation in the group event (and being provided a bonus award) corresponds to that player's relative level of game play.

Progressive awards associated with gaming machines are also known. In one form, a progressive award is an award amount which includes an initial amount and an additional amount funded through a portion of each wager made on the progressive gaming machine. For example, 0.1% of each wager placed on the primary game of a gaming machine may be allocated to the progressive award or progressive award fund. The progressive award grows in value as more players play the gaming machine and more portions of the players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award.

While such progressive awards are popular amongst players, a number of problems exist, such as only one person typically wins the progressive award. This may discourage the other players who have also been playing for a long period of time. Such discouragement can lead to players walking away with jackpot fatigue. Jackpot fatigue can occur when a player no longer finds an award desirable or worth the cost of continuing to play. This desire to quit playing is also due to the fact that a player may feel they must wait a substantial period of time for the jackpot to climb back to a high value. That is, when a progressive award is provided at a different gaming machine in the linked bank or group of gaming machines, a player may feel deflated and not wish to continue playing for a base or reset level progressive award. Accordingly, there is a continuing need to provide new and different gaming machines and gaming systems with one or more progressive awards.

SUMMARY

In one embodiment, the gaming system and method disclosed herein provides a community event, a group event or a group competition to a plurality of players at a plurality of the gaming devices in the gaming system. Such players at such gaming devices each attempt to remain participating in the group event until the conclusion of the group event. In one such embodiment, a player remains participating in the group event based on that player's wagering activity on the wagering games played by the player during the group event. Upon the conclusion of the group event, the gaming system determines which players at which gaming devices remained participating for the duration of the group event and provides such players at least part of a group event award, such as a progressive award. Accordingly, the gaming system and method disclosed herein provides that as each player's wagering activity associated with the group event wagering games played during the group event determines if that player remains eligible for the group event award, each player's probability of continued participation in the group event (and being provided at least part of a group event award) corresponds to that player's relative level of game play.

In one embodiment, the gaming system utilizes one or more timers, meters or periods to determine whether a player at a gaming device is currently participating in the group event. In this embodiment, each gaming device participating in the group event is associated with an individual group event eligibility timer, meter or period. In various embodiments, for each gaming device currently participating in the group event, the individual group event eligibility timer, meter or period associated with that gaming device decrements based on at least one factor (e.g., time) and may increment based on at least another factor (e.g., a player's wagers placed on a group event wagering game). In one such embodiment, if the individual group event eligibility timer associated with a gaming device participating in the group event lapses before the expiration of a group event timer, meter or period (which expires after a designated amount of time), that gaming device is eliminated from the group event. In another such embodiment, if the individual group event eligibility timer associated with a gaming device participating in the group event lapses before a group event terminating condition occurs (e.g., a designated game outcome is generated), that gaming device is eliminated from the group event. In such embodiments, upon the conclusion of the group event (i.e., the expiration of the group event timer or the occurrence of a group event terminating condition), a group event award is shared amongst the players at the remaining or non-eliminated gaming devices (i.e., the gaming devices associated with individual group event eligibility timers with any amount of remaining time). Accordingly, the gaming system disclosed herein provides a community group event wherein each player attempts to remain eligible for a group event award by sustaining or otherwise maintaining an individual group event eligibility timer above a designated level until the termination of the group event.

In one embodiment, the gaming system disclosed herein includes a central server, central controller or remote host in communication with or linked to a designated plurality of gaming machines or gaming devices. In one such embodiment, the gaming system monitors the games played at one or more of such gaming devices for an occurrence of a group event eligibility sequence triggering event associated with one of the gaming devices. In this embodiment, after the occurrence of the group event eligibility sequence triggering event, the gaming system provides a group event eligibility sequence to the player of that gaming device. If the player is unsuccessful in the group event eligibility sequence, no group event is provided and the gaming system continues monitoring the games played at one or more of such gaming devices for another occurrence of a group event eligibility sequence triggering event. On the other hand, if the player is successful in the group event eligibility sequence, the gaming system triggers a group event for a plurality of the gaming devices in the gaming system. That is, in one embodiment, the results of this group event eligibility sequence for a single player determine if that player and one or more other players at one or more other gaming devices participate in a triggered group event.

In one embodiment, the triggered group event includes a plurality of participating gaming devices each enabling a player to place one or more wagers on one or more plays of a group event wagering game. In this embodiment, each player at each participating gaming device attempts to remain eligible in the group event (i.e., not eliminated from the group event) until the conclusion of the group event to win at least part of a group event award. In one such embodiment, for each gaming device participating in the triggered group event, the gaming system displays an individual group event eligibility timer, meter or period. In this embodiment, each player at each participating gaming device attempts to sustain a pending or active individual group event eligibility timer (i.e., a group event eligibility timer with at least a designated amount of time remaining) until the conclusion of the group event to win at least part of a group event award.

In one embodiment, for each gaming device participating in the triggered group event, the gaming system regularly decrements or decreases the associated individual group event eligibility timer based on one or more factors related to the gaming activity of the player at that gaming device. In one such embodiment, the gaming system decreases each individual group event eligibility timer based on time or player inactivity. In one embodiment, for each gaming device participating in the triggered group event, the gaming system also increments or increases the associated individual group event eligibility timer based on one or more factors related to the gaming activity of the player at that gaming device. In one such embodiment, the gaming system increases the individual group event eligibility timer associated with a gaming device based on wagers placed at that gaming device. For example, each gaming device participating in a triggered group event is displayed a group event eligibility timer with an initial amount of time of fifteen seconds. In this example, each individual group event eligibility timer is regularly counting down based on time elapsed (i.e., the timer counts down in increments of one second) and adding time increments based on wagers placed on plays of group event wagering games during the group event (i.e., the timer adds one second for each credit wagered on each group event wagering game). Accordingly, each gaming device's individual group event eligibility timer may be decremented and incremented based on different factors or aspects of the player's action, performance or other gaming experience. Such a configuration provides that a player's probability of continued participation in the group event and ultimately being provided at least part of a group event award (i.e., the player sustaining an individual group event eligibility timer from expiring to win at least part of the group event award) corresponds to that player's relative level of game play during the triggered group event and/or corresponds to that player's relative level of game play before the triggered group event.

In one embodiment, the triggered group event is associated with a group event timer, meter or period. In this embodiment, if the individual group event eligibility timer associated with a gaming device expires or lapses before the expiration of the group event timer, that gaming device is eliminated from the group event. In one such embodiment, the expiration of the group event timer occurs after a designated amount of time. Thus, in this embodiment, if the individual group event eligibility timer associated with a gaming device lapses before the designated amount of time of the group event timer, that gaming device is eliminated from the group event. For example, if the group event timer lasts two-hundred seconds and an individual group event eligibility timer associated with a first gaming device counts down from fifteen seconds, then to avoid being eliminated from the group event, the player of the first gaming device must place an adequate amount of wagers to add enough time increments to the associated group event eligibility timer to avoid having the associated group event eligibility timer count down to zero seconds before the group event timer counts down to zero seconds. Accordingly, for this embodiment, the gaming system disclosed herein provides a community group event wherein each player's probability of continued participation in a triggered group event is based, at least in part, on one or more aspects of that player's gaming experience incrementing the individual group event eligibility timer associated with that player's currently played gaming device.

In this embodiment, upon the expiration of the group event timer, a group event award, such as a progressive award, is shared amongst the players at the gaming devices associated with individual group event eligibility timers with at least a designated amount of time remaining. That is, if a gaming device (or the player thereof) avoids being eliminated from the group event (based on one or more factors related to the player's gaming experience), the player of that gaming device is provided a group event award. Such a gaming system provides that a gaming establishment may advertise exactly when a group bonus event award, such as a progressive award, will be provided to one or more players. For example, if the group event timer lasts two-hundred seconds and a player at a first gaming device avoids being eliminated from the group event (i.e., by placing an adequate amount of wagers at the first gaming device to add enough time increments to the group event eligibility timer associated with the first gaming device to ensure that this group event eligibility timer does not count down to zero seconds before the two-hundred seconds of the group event timer have elapsed), the player of that gaming device is provided a portion of a group event award. In this example, since each remaining (i.e., non-eliminated) player is provided a portion of the group event award, the lower the quantity of players remaining at the conclusion of the triggered group event, the greater each player's portion of the group event award. In one such embodiment, as gaming devices are eliminated from the group event at different points in time, the gaming system causes each gaming device currently participating in the triggered group event to display a total group event award and/or a current relative portion of the group event award to the player that would win this portion of the group event award if that player remains participating for the duration of the group event.

In another embodiment, if the individual group event eligibility timer associated with a gaming device lapses before a group event terminating condition occurs, that gaming device is eliminated from the group event. In one such embodiment, the group event terminating condition is the generation of a designated game outcome (or other game event occurring). In these embodiments, upon the occurrence of the group event terminating condition, a group event award is shared amongst the players at the gaming devices currently associated with individual group event eligibility timers with at least a designated amount of time remaining. That is, in this embodiment, rather than requiring a player to sustain an individual group event eligibility timer above a certain amount of time until a group event timer expires to win a portion of a group event (as described above), the gaming system requires a player to sustain an individual group event eligibility timer above a certain amount of time until a group event terminating condition occurs to win a portion of a group event. For example, if a group event eligibility timer associated with a first gaming device counts down from fifteen seconds, then to avoid being eliminated from the group event, the player of the first gaming device must place an adequate amount of wagers to add enough time increments to this group event eligibility timer to avoid having the group event eligibility timer count down to zero seconds before a designated game outcome is generated at one of the gaming devices in the gaming system (i.e., before the group event terminating condition occurs).

In one embodiment, the gaming system enables one or more players the opportunity to extend an expired or near expired individual group event timer associated with that player's currently played gaming device. In this embodiment, if the individual group event eligibility timer or meter associated with a player's currently played gaming device is decremented to or near a designated amount of time remaining, the gaming system provides the player an opportunity to extend that individual group event timer, such as by resetting the amount of time of that individual group event eligibility timer or adding an amount of time to that individual group event eligibility timer. For example, if the individual group event eligibility timer associated with a player's gaming device has decreased to zero time remaining, that gaming device provides the player an opportunity to increment that individual group event eligibility timer via a random outcome or other game. In this example, the results of the random outcome determine whether or not that individual group event eligibility timer is extended.

In one embodiment, the player's probability of success in this group event timer extension opportunity is based on that player's quantity of accumulated group event elements. In this embodiment, the gaming system provides and tracks group event elements accumulated by players playing at the gaming devices in the gaming system prior to the group event and/or during the group event. In this embodiment, based on one or more aspects of the player's gaming experience (such as based on the player's wagers placed), a group event element accumulation event occurs and the gaming system provides one or more group event elements to a player. That is, this embodiment provides that the player's previous gaming experience in accumulating group event elements determines the player's probability of extending the individual group event eligibility timer associated with the player's currently played gaming device and thus determines the player's probability of winning at least part of a group event award. For example, if a first player has accumulated a first quantity of group event elements, a second player has accumulated a greater, second quantity of group event elements and the individual group event eligibility timers for both the first player and the second player lapse or expire, then the gaming system provides each of the players an opportunity to extend the individual group event eligibility timer associated with that player's gaming device, wherein the second player has a greater probability of successfully extending a group event eligibility timer than the first player. Accordingly, this embodiment provides that that the greater the quantity of accumulated group event elements, the greater the player's probability of remaining in the triggered group event. As described above, the greater the player's probability of remaining in the triggered group event, the greater the player's probability of at least sharing in a group event award.

Additional features and advantages are described in, and will be apparent from, the following Detailed Description and the figures.

DETAILED DESCRIPTION

The present disclosure may be implemented in various configurations for gaming machines, gaming devices or gaming systems, including but not limited to: (1) a dedicated gaming machine, gaming device or gaming system wherein the computerized instructions for controlling any games (which are provided by the gaming machine or gaming device) are provided with the gaming machine or gaming device prior to delivery to a gaming establishment; and (2) a changeable gaming machine, gaming device or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
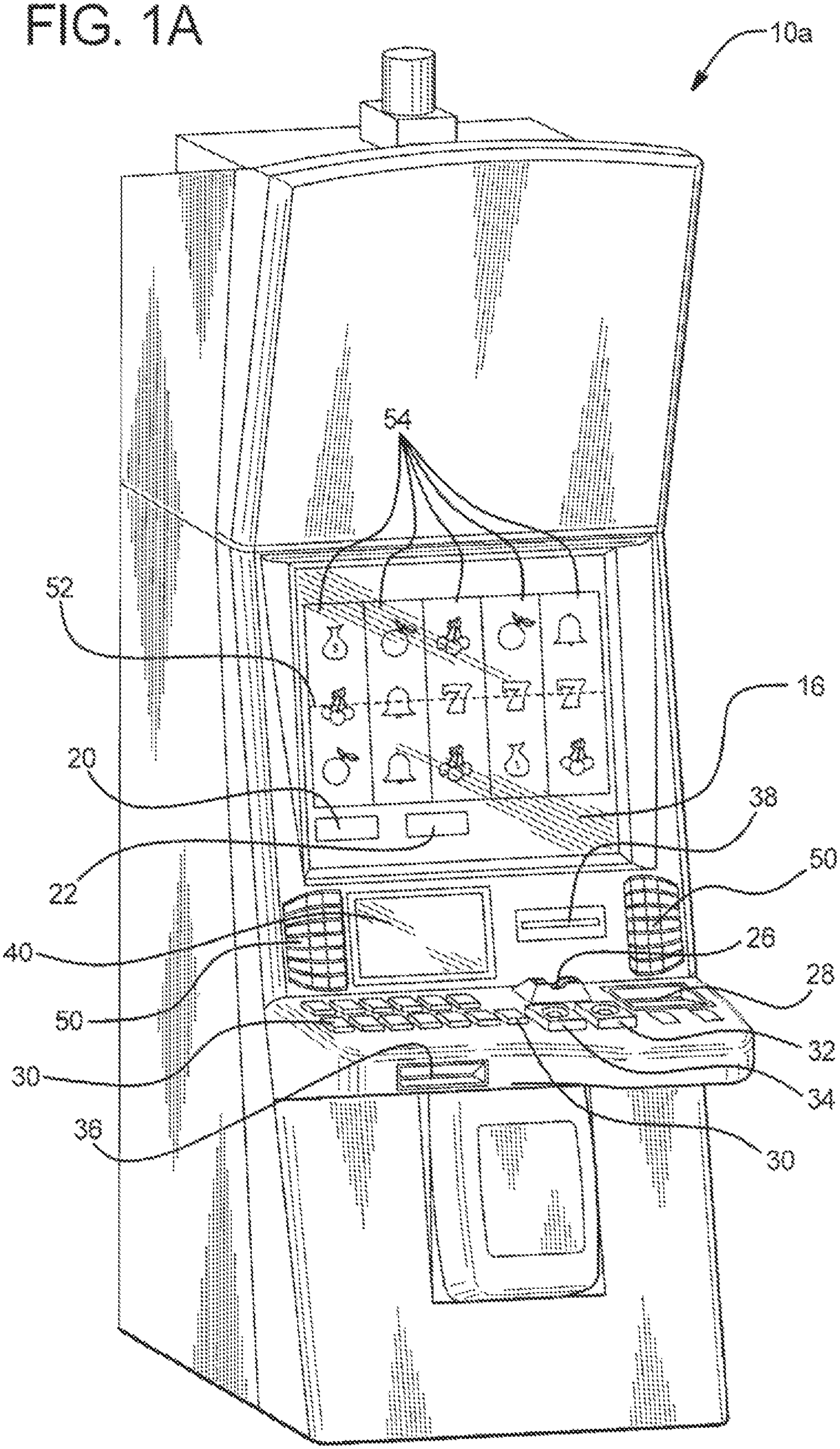
FIG. 1A is a front-side perspective view of one embodiment of the gaming device disclosed herein.
Figure 1B:
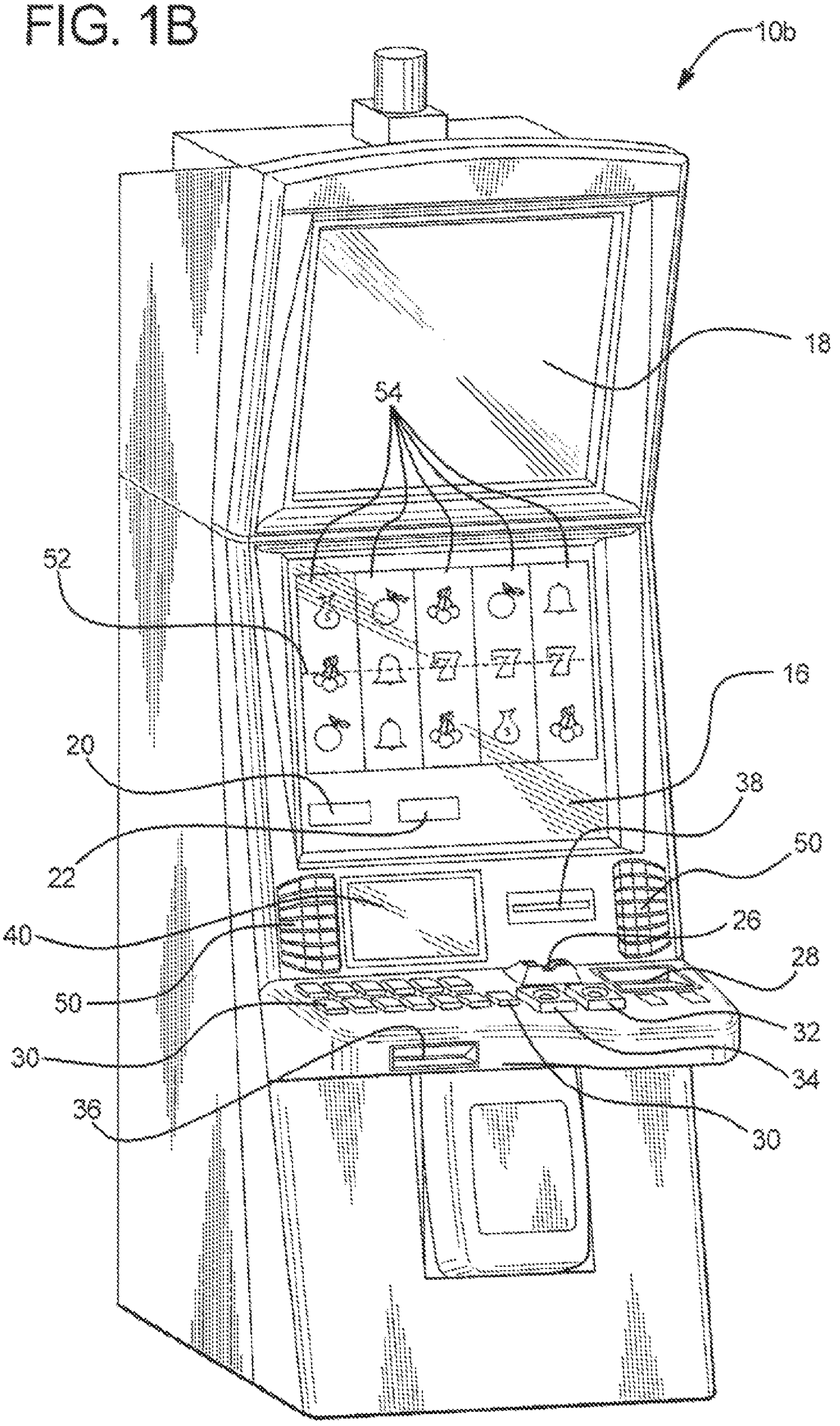
FIG. 1B is a front-side perspective view of another embodiment of the gaming device disclosed herein.

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
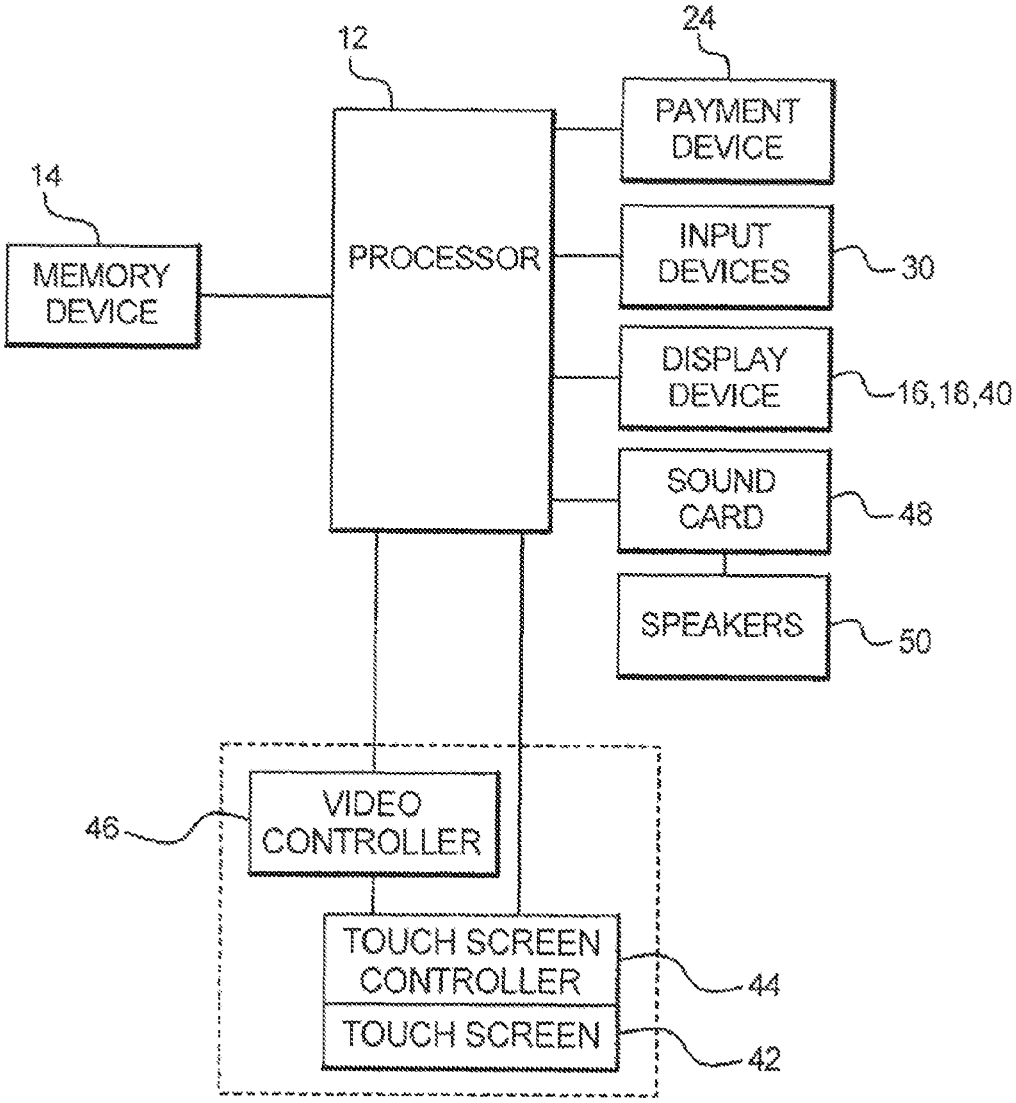
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded.

In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
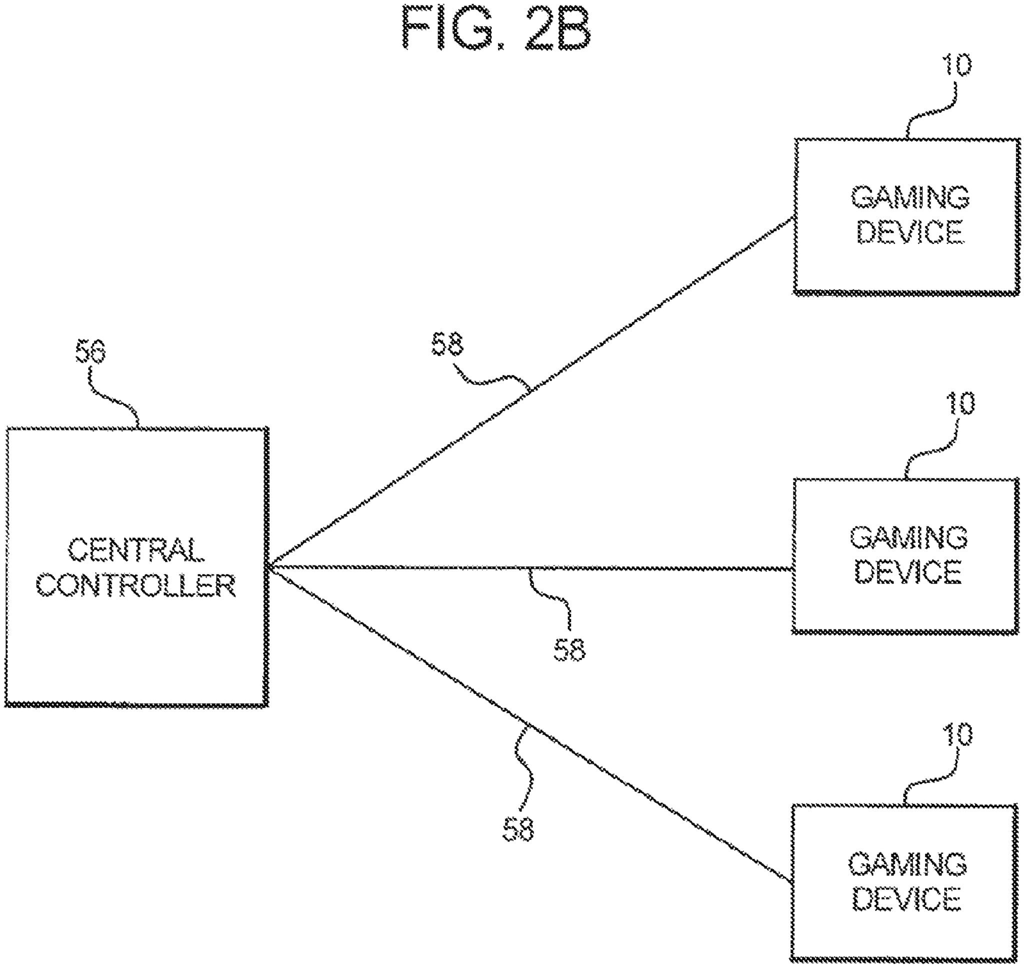
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the gaming system disclosed herein is implemented via a data network, such as an internet or intranet. In one such embodiment, the operation of a gaming device can be viewed at the gaming device with at least one internet browser. In another such embodiment, the operation of a gaming device can be viewed at a location remote from the gaming device or gaming establishment utilizing at least one internet browser. In these embodiments, operation of the gaming device may be accomplished with only a connection to the central server or controller (i.e., an internet/intranet server) through a conventional phone or other data transmission line, digital subscriber line (DSL), T-1 line, coaxial cable, fiber optic cable, or other suitable connection. Accordingly, players may access an internet game page from any location where an internet connection and computer, or other internet facilitator is available. It should be appreciated that the expansion in the number of computers and number and speed of internet connections in recent years increases opportunities for players to play from an ever-increasing number of remote sites. It should be further appreciated that enhanced bandwidth of digital wireless communications may render such technology suitable for some or all communications, particularly if such communications are encrypted. Higher data transmission speeds may be useful for enhancing the sophistication and response of the display and interaction with the player.

In one embodiment, the central server (i.e., an internet/intranet server) maintains at least one dedicated gaming site which is associated with one or more progressive awards and one or more supplemental funds as disclosed herein. In operation, a player logs onto the dedicated gaming site and the central server enables the player to wager on and participate in one or more online games at this gaming site. In this embodiment, upon the occurrence of any progressive award increase event, the central server adds a value or amount (from the maintained supplemental fund) to one or more of the progressive awards associated with the dedicated gaming site.

In one embodiment, to regulate and monitor the play of games over the internet, player's identifications are verified through credit card authentication. Through this authentication, the gaming system verifies the player, the player's age, the player's location and any other suitable information associated with the player. In one such embodiment, the gaming system utilizes the verified location information to monitor and ensure that the player in a certain location follows any applicable gaming regulations associated with that location. In another such embodiment, the gaming system utilizes the verified location information to set up different progressive awards for different regions. In this embodiment, different progressive awards are allotted per region.

In another embodiment including game play over the internet, the gaming system stores information about one or more players. In this embodiment, after a player has enrolled or identified themselves with the gaming system (via the dedicated gaming site), the gaming system stores their information, such as credit card information, preferred options, player number, name, or any other information in a database. In one such embodiment, the gaming system enables the player to set and store one or more gaming options, such as jackpot betting, side wagering, and preferred games, associated with the dedicated gaming site.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In one embodiment, a plurality of gaming devices at one or more gaming sites are networked to the central server in a progressive configuration, wherein a portion of each wager placed is allocated to one or more progressive awards. In one embodiment, such progressive awards are associated with the system of gaming machines which each contribute portions of the progressive awards. In one such embodiment, different progressive awards are associated with different numbers of gaming devices. For example, a progressive award valued at $10,000 may be associated with ten gaming devices while another progressive award valued at $500,000 may be associated with one-hundred gaming devices. In one embodiment, the multiple gaming machines may be in the same bank of machines, in the same casino or gaming establishment such as through a LAN or in two or more different casinos or gaming establishments such as through a WAN. In another embodiment, each individual gaming machine maintains one or more progressive awards wherein a portion of each wager placed at that respective gaming machine is allocated to one or more progressive awards maintained by such individual gaming machine. In another embodiment, each individual gaming machine maintains one or more progressive awards and the central server simultaneously or substantially simultaneously maintains one or more progressive awards. In one such embodiment, the lower valued, more frequently triggered progressive awards are maintained by the individual gaming machines and the higher valued, less frequently triggered progressive awards are maintained by the central server.

In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state. In one embodiment, the host site computer is maintained for the overall operation and control of the system. In this embodiment, a host site computer oversees all or part of the progressive gaming system and is the master for computing all or part of the progressive jackpots. All participating gaming sites report to, and receive information from, the host site computer. Each central server computer is responsible for all data communication between the gaming device hardware and software and the host site computer.

In one embodiment, more than one of the progressive awards start at the same level, such as $1000 and increment or increase until provided to a player. In another embodiment, more than one of the progressive awards start at different levels such as $10, $100, $1000 and $10,000 and increment or increase until provided to a player. The progressive awards accumulate based on a small percentage (such as 0.1%) of coin-in or wagered amounts in a conventional manner. In one embodiment, the percentage that goes to each progressive award is equal (such as 0.1% to each of four progressive awards). At this accrual rate, player wagers totaling $1,000,000 are required for the progressive to reach $1000. In one embodiment, at least a fraction of this amount may be funded by the casino by using a starting value higher than zero to make the progressive awards attractive even after they are reset. In other embodiments, two or more of the progressive awards may be funded by different percentages. In these embodiments, the central server and/or individual gaming device processor continues to increase the progressive levels until a progressive award is provided to a player (upon the occurrence of a progressive award triggering event), at which point the progressive is reset and another progressive award starts incrementing from the appropriate default progressive award level. In another embodiment, one or more progressive awards increment a predetermined amount per game played. In one such embodiment, this incremental amount is partially funded by an amount of the wagers placed and is partially funded by an amount provided by a gaming establishment marketing or advertisement department. In different embodiments, the gaming establishment marketing or advertisement department provides a value or amount to the progressive award based on matching a percentage of wagers placed, a predetermined amount for each game played, an elapsed period of time, or any other suitable manner.

In another embodiment, two or more of the progressive awards may be funded at different temporal rates. In this embodiment, the different progressive awards are incremented or funded in different increments of time wherein until the progressive hits, a set amount is added to the progressive at each determined time increment. In another embodiment, two or more of the progressive awards may each be incremented or funded based on different incrementing factors or incrementors. In this embodiment, a first of the progressive awards may increment each time a first incrementing factor occurs and a second of the progressive awards may increment each time a second incrementing factor occurs, wherein the first incrementing factor and the second incrementing factor are different. Examples of incrementing factors could be a symbol-driven trigger in the base game, the player betting a maximum amount, a percentage of possible gaming machines being actively played or in active status, or any other suitable method for defining an incrementor.

In one embodiment, one or more of the progressive awards are funded, at least partially, via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed. In another embodiment, one or more progressive awards are funded, at least partially, via an amount provided by one or more marketing and/or advertising departments, such as a casino's marketing department.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In one embodiment, the central server or other central controller determines when one or more progressive award wins are triggered. In this embodiment, a central controller and an individual gaming machine work in conjunction with each other to determine when a progressive award win is triggered, for example through an individual gaming machine meeting a predetermined requirement or criteria established by the central controller. In another embodiment, an individual gaming machine may determine when one or more progressive award wins are triggered. In another embodiment, an individual gaming machine may determine when at least one progressive award win is triggered and the central controller determines when at least one progressive award win is triggered.

In one embodiment, different gaming devices in the gaming system have different progressive awards available to a player. In one such embodiment, different types of gaming devices are associated with different types of progressive awards based on the current configuration of the gaming system. In one embodiment, zero, one or more progressive awards may be associated with each of the gaming devices in the gaming system while zero, one or more different progressive awards may be associated with a plurality of, but not all of the gaming devices in the gaming system.

In one embodiment, at least one and preferably a plurality of the progressive awards maintained by the gaming system are provided to players of the linked gaming machines in an apparently random fashion as perceived by the players of these gaming machines. These progressive awards are distinguished from the awards that the gaming machines provide to the players for displayed winning outcomes in the plays of the primary wagering games, such as slot games, card games (e.g., poker, blackjack) or any other suitable game.

In one embodiment, the gaming devices do not provide any apparent reasons to the players for obtaining such progressive awards. In this embodiment, providing the progressive awards is not triggered by a displayed event in the primary game or based specifically on any of the displayed plays of any primary game or on any of the displayed plays of any secondary game of the gaming machines in the system. That is, these progressive awards are provided to the players without any explanation or alternatively with simple explanations.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Group Event

Figure 3:
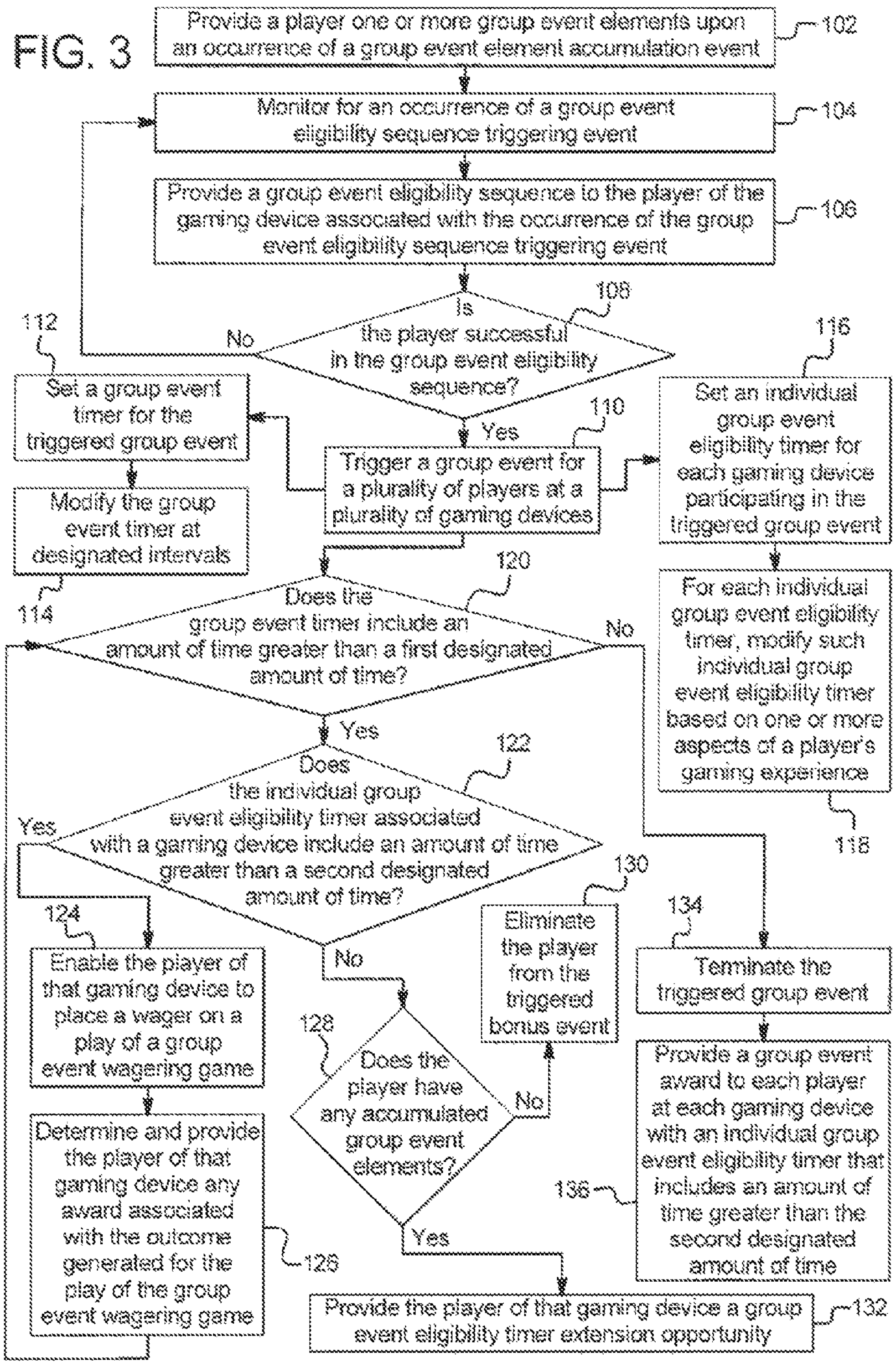
FIG. 3 is a flow-chart of one embodiment of the gaming system disclosed herein illustrating a triggered group event for a plurality of gaming devices that concludes upon the expiration of the group event timer.

Turning now to FIG. 3, in addition to enabling one or more players at one or more of the gaming devices to play one or more primary games prior to the occurrence of a group event, community event or group competition (as described above), in one embodiment, the gaming system disclosed herein provides (and accumulates for) a player one or more group event elements upon an occurrence of each group event element accumulation event as indicated in block 102. As described below, in different embodiments, the gaming system utilizes such accumulated group event elements to determine if a group event is triggered and/or if a player prolongs their amount of time to participate in the group event.

Figure 4A:
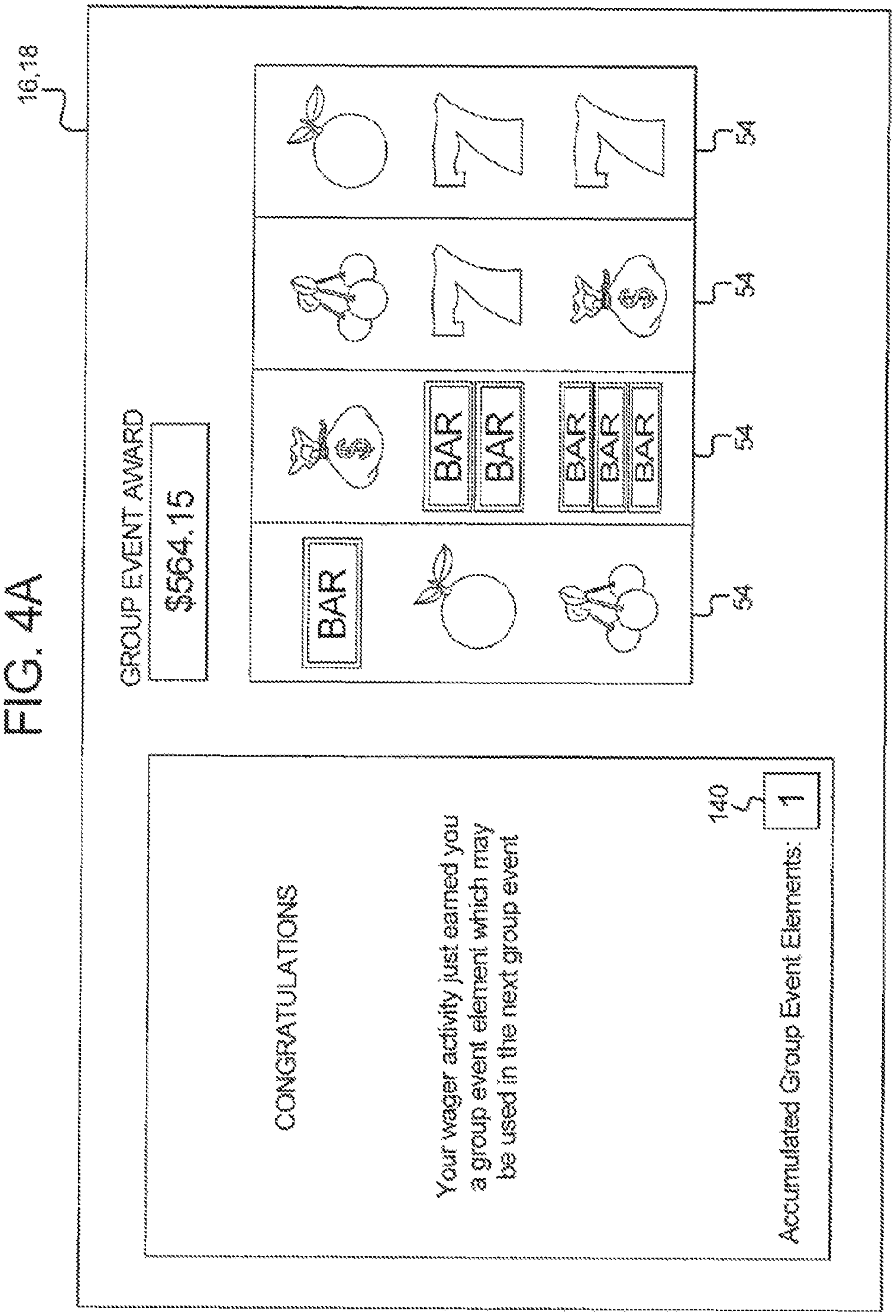
FIGS. 4A, 4B, 4C and 4D are enlarged elevation views of different embodiments of the display of a gaming device of the gaming system disclosed herein illustrating different events associated with a triggered group event.

In one embodiment, a group event accumulation event occurs for a player upon that player initiating play at the gaming device. In one such embodiment, different players of different player ranking statuses are each provided a different quantity of group event elements upon initiating play at one of the gaming devices. For example, a gold level player is provided one group event element upon initiating play at one of the gaming devices and a platinum level player is provided five group event elements upon initiating play at one of the gaming devices. In another embodiment, a group event element accumulation event additionally/alternatively occurs if a player wagers at least a designated amount (i.e., a player's coin-in reaches a group event element accumulation event threshold). For example, as seen in FIG. 4A, for wagering one-hundred credits (over one or more plays of the primary game), the gaming system causes a group event element accumulation event to occur and provides the player one group event element. In this example, the gaming system maintains any accumulated group event elements for each gaming device or player and causes a display of any accumulated group event elements (as illustrated in the group event element indicator 140 of FIG. 4A). Appropriate messages such as "CONGRATULATIONS" and "YOUR WAGER ACTIVITY JUST EARNED YOU A GROUP EVENT ELEMENT WHICH MAY BE USED IN THE NEXT GROUP EVENT" may be provided to the player visually, or through suitable audio or audiovisual displays.

In one embodiment, in addition to providing one or more group event elements (in response to one or more occurrence of group event element accumulation events), the gaming system monitors for an occurrence of a group event eligibility sequence triggering event as indicated in block 104 of FIG. 3. In one embodiment, a group event eligibility sequence triggering event occurs if a player has placed a wager of at least a designated amount and that player's currently played gaming device generates an outcome associated with at least a designated award amount. For example, the group event eligibility sequence triggering event occurs if a player has placed at least the maximum wager amount on a play of a primary game and the player's currently played gaming device generated an outcome associated with an award of at least fifty credits.

In another embodiment, a group event eligibility sequence triggering event occurs based on a displayed event in a play of one or more displayed games of one or more of the gaming devices in the gaming system. In another embodiment, a group event eligibility sequence triggering event occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether a group event eligibility sequence triggering event has occurred. In another embodiment, the gaming system defines one or more game play parameters, wherein each time a player's tracked game play activity satisfies the defined parameter, the group event eligibility sequence triggering event occurs.

In one embodiment, upon an occurrence of a group event eligibility sequence triggering event in association with one of the gaming devices, the gaming system provides a group event eligibility sequence to the player of that gaming device as indicated in block 106. The gaming system enables the player of that gaming device to play the group event eligibility sequence wherein the results of the group event eligibility sequence determine whether or not a group event is triggered. It should be appreciated that any suitable primary game or secondary game may be incorporated as the group event eligibility sequence provided to the players of the gaming devices of the gaming system disclosed herein. In different embodiments, the group event eligibility sequence may incorporate any of the types of games described herein, as well as any suitable puzzle-type game, any suitable persistence game, any suitable wheel game, any suitable selection game, any suitable offer and acceptance game, any suitable cascading symbols game, any suitable ways to win game, any suitable scatter pay game, any suitable group game or any other suitable type of game.

In one embodiment, the gaming system determines if the player is successful in the group event eligibility sequence as indicated in diamond 108 of FIG. 3. If the player is unsuccessful in the group event eligibility sequence, no group event is provided and the gaming system continues monitoring the games played at one or more of such gaming devices for another occurrence of a group event eligibility sequence triggering event as indicated in block 104. In one such embodiment, if the player is unsuccessful in the group event eligibility sequence, the gaming system provides that player a consolation award. On the other hand, if the player is successful in the group event eligibility sequence, the gaming system triggers a group event for a plurality of players at a plurality of gaming devices as indicated in block 110 of FIG. 3. In this embodiment, the results of the group event eligibility sequence for a single player determine if that player and one or more other players participate in a triggered group event.

Figure 4B:
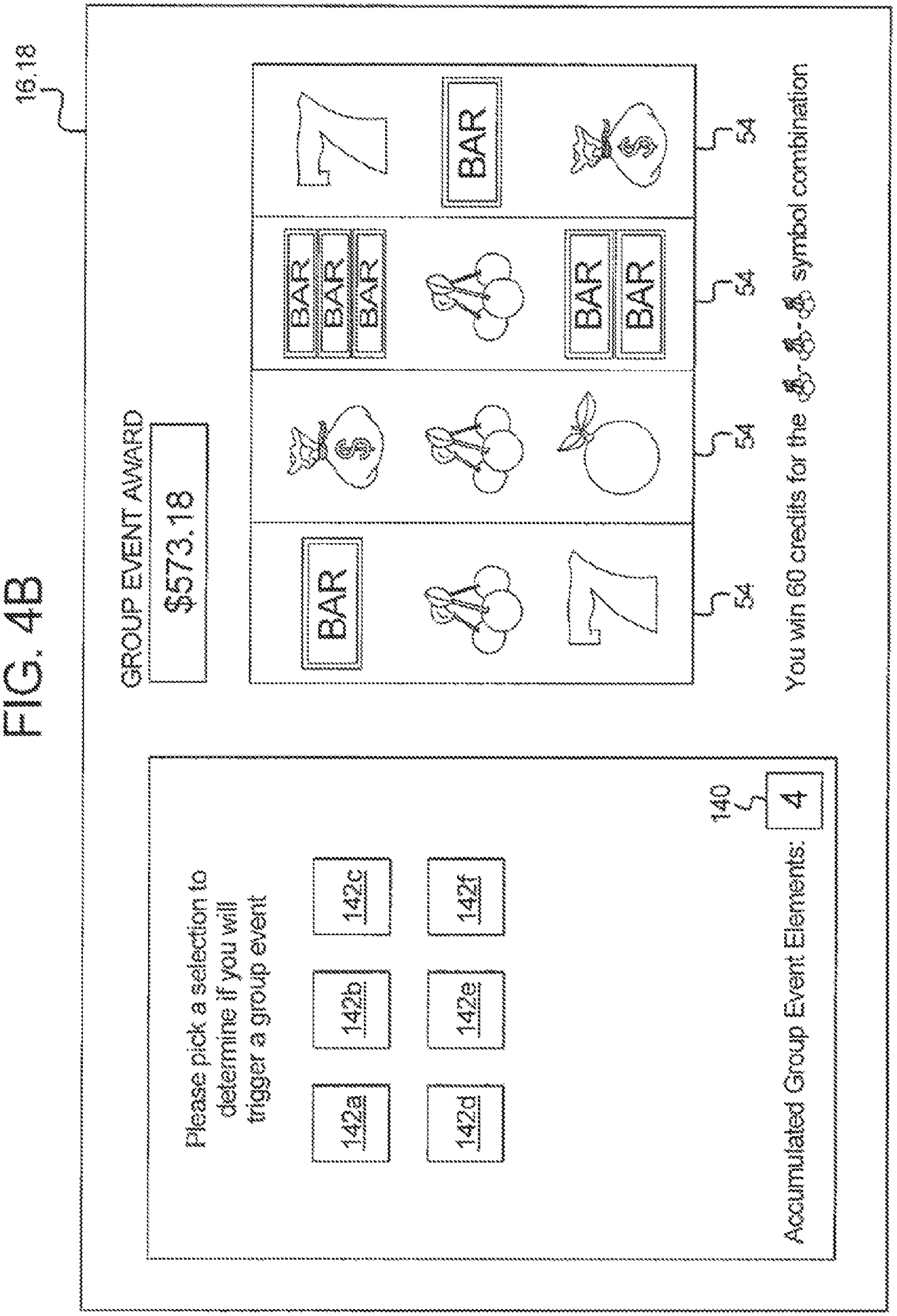

In one embodiment, for a player participating in a group event eligibility sequence, the gaming system determines a probability of success in the group event eligibility sequence and determines if the player is successful in the group event eligibility sequence based on this determined probability of success. For example, as seen in FIG. 4B, if the gaming system determines that a player has a 50% chance of success in the group event eligibility sequence and the group event eligibility sequence is provided via enabling the player to pick one of six selections 142*a* to 142*f* in a selection game (wherein each accumulated group event is associated with a separate selection), then the gaming system associates 50% of the selections (i.e., three of the selections) with a successful or positive outcome and associates 50% of the selections (i.e., three of the selections) with an unsuccessful or negative outcome. In this example, appropriate messages such as "PLEASE PICK A SELECTION TO DETERMINE IF YOU WILL TRIGGER A GROUP EVENT" may be provided to the player visually, or through suitable audio or audiovisual displays. In one embodiment, in addition to informing the player participating in the group event eligibility sequence that a group event may be triggered, the gaming system displays an alert to one or more of the players at the other gaming devices to show these players that a group event may be triggered in the near future.

Following the example illustrated in FIG. 4B, if the player picks any of the three selections (out of the six available selections) not associated with an accumulated group event element, the gaming system determines that the player is unsuccessful in the group event eligibility sequence and continues monitoring the games played at one or more of such gaming devices for another occurrence of a group event eligibility sequence triggering event. On the other hand, if the player picks one of the three selections (out of the six available selections) associated with an accumulated group event element, the gaming system determines that the player is successful in the group event eligibility sequence and triggers a group event for a plurality of players at a plurality of gaming devices in the gaming system.

In one embodiment, for a player participating in a group event eligibility sequence, the player's probability of success in the group event eligibility sequence is based on that player's quantity of accumulated group event elements. For example, if a player has accumulated five group event elements and the group event eligibility sequence is provided via enabling the player to pick one of six selections in a selection game (wherein each accumulated group event is associated with a separate selection), then the player's probability of success in the group event eligibility sequence is 83% (or 5/6). In one such embodiment, if the player picks a selection associated with an accumulated group event element, then that accumulated group event element is utilized for the group event eligibility sequence and not available for any subsequent group event timer extension opportunity as described below. For example, if the player picks one of the five selections associated with an accumulated group event element, then that group event element is utilized in the group event eligibility sequence and the player retains four accumulated group event elements to be utilized in any subsequently provided bonus even timer extension opportunity. In one such embodiment, if the player picks a selection not associated with an accumulated group event element, then that accumulated group event element is retained for subsequent use. In another such embodiment, if the player picks a selection associated with an accumulated group event element, then that accumulated group event element is utilized for the group event eligibility sequence and remains available for any subsequent group event timer extension opportunity.

In one embodiment, if the player is successful in the group event eligibility sequence, the gaming system enables each player at each gaming device to participate in the triggered group event. That is, the gaming system determines that each gaming device is a participating gaming device for the triggered group event. In another embodiment, if the player is successful in the group event eligibility sequence, the gaming system causes each gaming device with at least one accumulated group event element to participate in the triggered group event. In another embodiment, if the player is successful in the group event eligibility sequence, the gaming system causes each of the currently active gaming devices to participate in the triggered group event. In this embodiment, the gaming system determines the status of the gaming devices and provides each gaming device which is in active status a chance to participate in the group event. In this embodiment, upon the triggering of a group event (i.e., a successful outcome in the group event eligibility sequence), each gaming device is determined to be in either active status or enrolled or inactive status. Active status means that the gaming device is being actively played by a player, wherein the active status requirements can be based on any suitable number of satisfied criteria or defined in any suitable manner by the implementer of the gaming system. For example, the current level of a gaming device's accumulated wager pool (i.e., is an accumulated wager pool at or above a designated threshold wager level) may be part of the determination of whether that gaming device is in the active status. In another example, a play of or wager on the primary game of the gaming device within a predetermined period of time may be part of the determination of whether that gaming device is in the active status. Other factors such as: (a) the amount of time between each play of or wager on the primary game of the gaming device; (b) the amount being wagered on the primary game(s); and (c) the number of plays within a period of time, may also or alternatively be part of the determination of whether a gaming device is in the active status. On the other hand, inactive status means that the gaming device is not in the active status (i.e., not being actively played by a player according to one or more of the predetermined criteria).

Figure 5A:
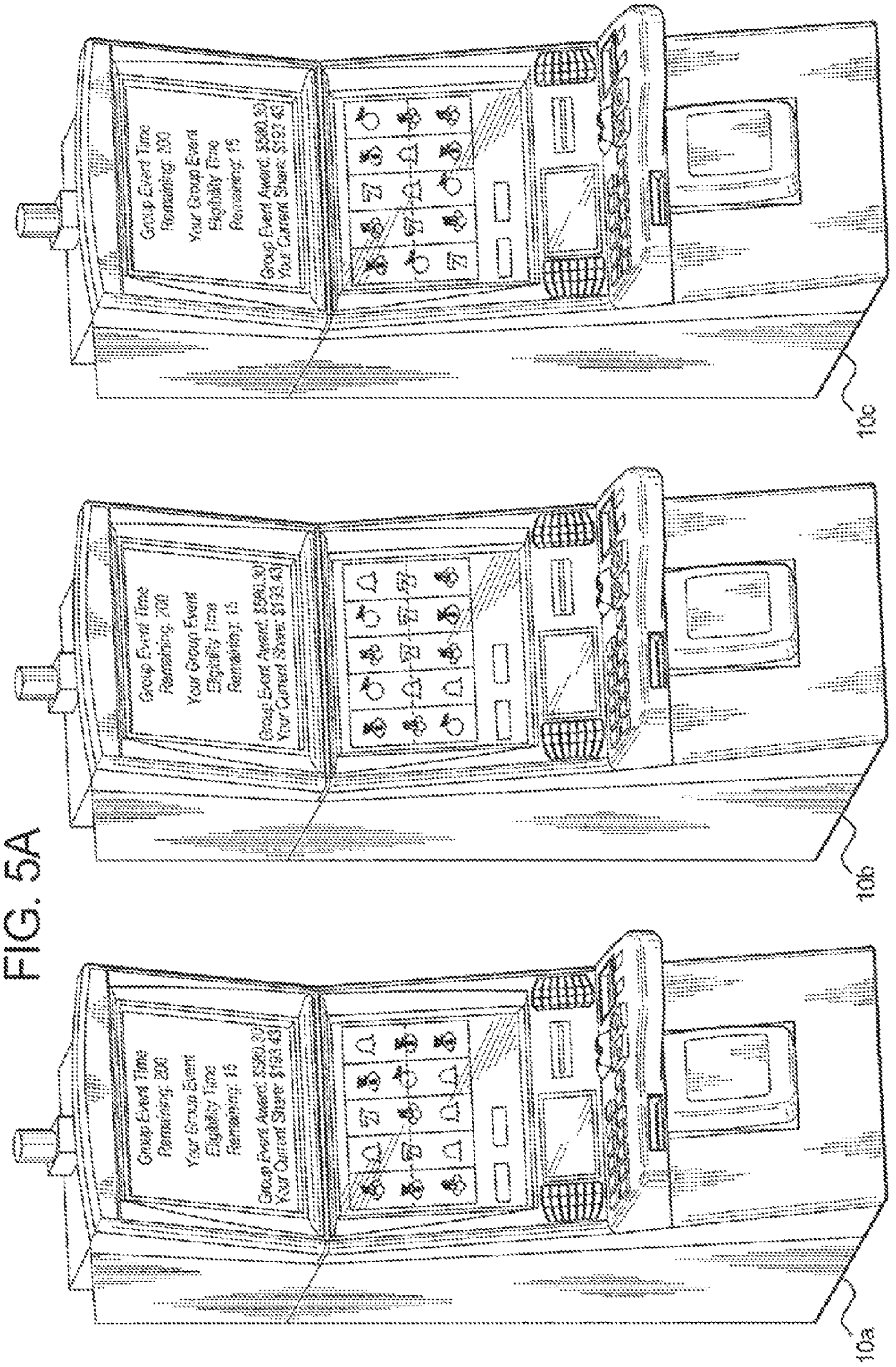
FIGS. 5A, 5B, 5C and 5D are schematic diagrams of one embodiment of the gaming system disclosed herein illustrating a plurality of gaming devices each participating in the trigged group event at different points in time.

In one embodiment, if the player is successful in the group event eligibility sequence, the gaming system sets a group event timer for the triggered group event as indicated in block 112 of FIG. 3. The group event timer (or group event meter or period) represents the maximum duration of time the group event will last. For example, as seen in FIG. 5A, after triggering the group event, the gaming system determines that the group event timer will run for no more than two-hundred seconds and displays such information to each gaming device selected to participate in the triggered group event. After setting the group event timer and triggering the group event, the gaming system modifies the group event timer at designated intervals as indicated in block 114 of FIG. 3. For example, after setting the group event timer to two-hundred seconds, the gaming system begins counting down the group event timer in increments of one second. In this embodiment, a group event timer with at least a designated amount of time remaining is considered an active or pending group event timer and a group event timer without at least the designated amount of time remaining is considered expired group event timer.

In addition to setting and modifying a group event timer for the triggered group event, if the player is successful in the group event eligibility sequence, the gaming system also sets an individual group event eligibility timer for each gaming device participating in the triggered group event as indicated in block 116. In this embodiment, each individual group event eligibility timer (or individual group event eligibility meter or period) is set to an initial value, such as an initial amount of time. For example, as seen in FIG. 5A, after triggering the group event, the gaming system causes each gaming device participating in the triggered group event to display a group event eligibility timer with an initial time of fifteen seconds. It should be appreciated that the initial amount of time each individual group event eligibility timer is set to is less than the initial amount of time the group event timer is set to. As described below, such a configuration provides that a player at a gaming device initially participating in the triggered group event must perform some action (e.g., place an adequate amount of wagers) to increment the associated group event eligibility timer to remain participating in the triggered group event.

After setting each individual group event eligibility timer and triggering the group event, for each individual group event eligibility timer, the gaming system modifies such individual group event eligibility timer based on one or more aspects of a player's gaming experience as indicated in block 118 of FIG. 3. In one such embodiment, the gaming system modifies or maintains such individual group event eligibility timers by regularly decrementing or decreasing each individual group event eligibility timer or meter based on elapsed time. For example, during the play of the triggered group event, each group event eligibility timer is regularly counting down in increments of one second. That is, the gaming system causes one or more group event eligibility timer decrease events to occur for the group event eligibility timers associated with the gaming devices participating in the group event. In different embodiments, a group event eligibility timer decrease event occurs based one or more factors including, but not limited to: (i) time, (ii) player inactivity, (iii) placing a wager below a designated wager level, (iv) placing wagers at a rate below a designated rate, (v) winning one or more awards below a designated award level, (vi) a generation of one or more game outcomes or (vii) any combination thereof.

In one embodiment, for one or more group event eligibility timers associated with one or more gaming devices participating in the group event, the gaming system also modifies or maintains such individual group event eligibility timers by incrementing or increasing such individual group event eligibility timers. That is, the gaming system causes one or more group event eligibility timer increase events to occur for one or more group event eligibility timers associated with one or more gaming devices participating in the group event. For example, if a player at a gaming device participating in the triggered group event places a wager on a group event wagering game (as described below), the gaming system causes a group event eligibility timer increase event to occur and increases the amount of available time of the individual group event eligibility timer associated with that gaming device. In different embodiments, a group event eligibility timer increase event occurs based one or more factors including, but not limited to: (i) maintaining an active status for a designated amount of time, (ii) placing a wager at least at a designated wager level, (iii) placing wagers at a rate at least at a designated rate, (iv) winning one or more awards at least equal to a designated award level, (v) a generation of one or more game outcomes or (vi) any combination thereof.

Figure 4C:
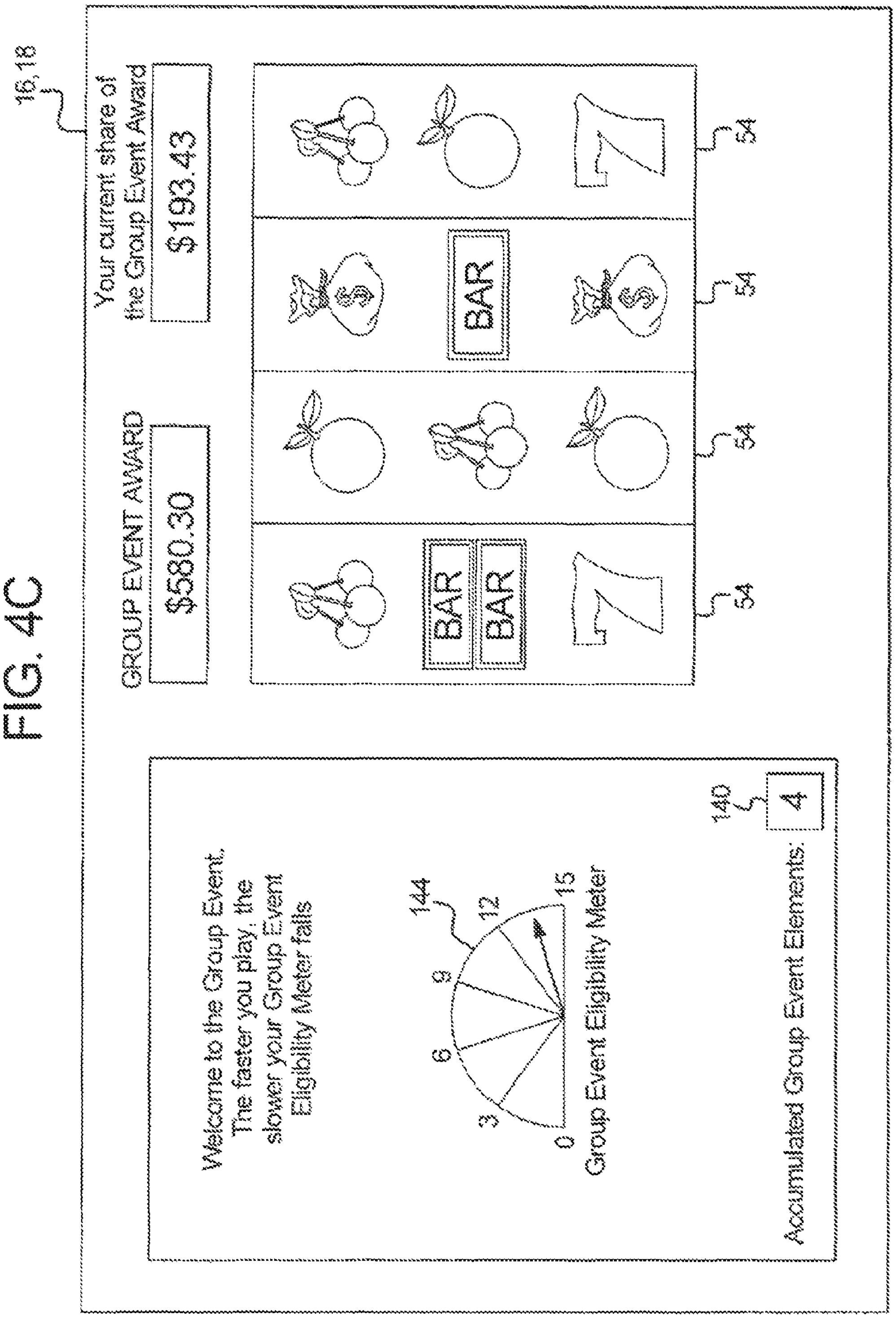

In one example, if a first player at a first gaming device participating in the triggered group event is wagering one credit per group event wagering game and playing such group event wagering games at a rate of one game every three seconds, the gaming system: (i) regularly decreases the individual group event eligibility timer associated with the first gaming device in increments of one second and (ii) increases the individual group event eligibility timer associated with the first gaming device by one second to account for first player's wager of one credit on each play of the group event wagering game. In this example, if the individual group event eligibility timer associated with the first gaming device begins at fifteen seconds, then: (i) three seconds into the triggered group event, that individual group event eligibility timer will have thirteen seconds remaining, (ii) nine seconds into the triggered group event, that individual group event eligibility timer will have nine seconds remaining, and (iii) fifteen seconds into the triggered group event, that individual group event eligibility timer will have five seconds remaining. Accordingly, each the individual group event eligibility timer associated with each gaming device currently participating in the triggered group event may be simultaneously decremented and incremented based on different factors or aspects of the player's gaming experience. In this embodiment, each individual group event eligibility timer with at least a designated amount of time remaining is considered a pending or active individual group event eligibility timer and each individual group event eligibility timer without at least the designated amount of time remaining is considered an expired individual group event eligibility timer. As seen in FIG. 4C, the gaming device displays an individual group event eligibility timer 144 in any suitable manner, such as using a meter. In this example, appropriate messages such as "WELCOME TO THE GROUP EVENT" and "THE FASTER YOU PLAY, THE SLOWER YOUR GROUP EVENT ELIGIBILITY METER WILL FALL" may be provided to the player visually, or through suitable audio or audiovisual displays.

In another embodiment, an occurrence of a group event eligibility timer increase event for one player corresponds to an occurrence of a group event eligibility timer decrease event for at least another player at another gaming device in the gaming system. In one such embodiment, every wager placed by a first player causes a group event eligibility timer increase event for that first player and a group event eligibility timer decrease event for at least a second player and every wager placed by the second player causes a group event eligibility timer increase event for the second player and causes a group event eligibility timer decrease event for at least the first player. In another such embodiment, every time a player is eliminated from the group event, a group event eligibility timer increase event occurs for the remaining players currently participating in the group event.

In addition to setting and subsequently modifying the group event timer and each individual group event eligibility timer, if the player is successful in the group event eligibility sequence, the gaming system determines a group event award for the triggered group event. In one embodiment, the group event award is a progressive award. In one embodiment, the progressive award increases in value based on wagers placed (as described above) until the group event is triggered. At this point in time, the current value of the progressive award is set and any subsequent wagers placed at the gaming devices in the gaming system fund the progressive award for the next triggered group event. In another embodiment, the progressive award increases in value based on wagers placed (as described above) until the triggered group event is terminated.

In one embodiment, as player's are eliminated from the triggered group event (as described below), the value of each remaining player's relative portion of the group event award is determined and displayed to such players. For example, as seen in FIGS. 4C and 5A, the gaming system determines that a group event progressive award of $580.30 will be provided to zero, one or more players participating in the triggered group event. As further seen in FIGS. 4C and 5A, at this point in time, the gaming system determines that each currently participating gaming device's relative portion of this group event progressive award is $193.43 (i.e., $580.30/3 currently participating gaming devices) which is displayed to the players of such currently participating gaming devices.

In operation of one embodiment of the triggered group event, as indicated in diamond 120 of FIG. 3, the gaming system determines if the group event timer includes an amount of time greater than a first designated amount of time. That is, the gaming system determines if the group event period has lapsed or expired. In this embodiment, if the gaming system determines that the group event timer includes an amount of time greater than the first designated amount of time (e.g., if the group event timer has at least one second remaining), for each gaming device currently participating in the group event, the gaming system determines if the individual group event eligibility timer associated with that gaming device includes an amount of time greater than a second designated amount of time as indicated in diamond 122. That is, the gaming system determines if such gaming devices each remain eligible to participate in the triggered group event. For example, as seen in FIG. 5A, after triggering the group event, the gaming system first determines that the group event timer includes two-hundred seconds (i.e., an amount of time greater than a first designated amount of zero seconds) and then determines for a specific gaming device, that the individual group event eligibility timer for that gaming device includes fifteen seconds (i.e., an amount of time greater than the second designated amount of zero seconds). In different embodiments, the first designated amount of time and the second designated amount of time are the same, substantially the same or different.

If the gaming system determines that the individual group event eligibility timer associated with a gaming device currently participating in the group event includes an amount of time greater than the second designated amount of time, the gaming system enables the player of that gaming device to place a wager on a play of a group event wagering game as indicated in block 124 of FIG. 3. In this embodiment, the gaming system determines and provides the player of that gaming device any award associated with the outcome generated for the play of the group event wagering game as indicated in block 126. After providing the player of that gaming device any award associated with the outcome generated for the play of the group event wagering game, the gaming system return to diamonds 120 and again determines if the group event timer includes an amount of time greater than a first designated amount of time. It should be appreciated that as described above, in one embodiment, the player's wager on a play of the group event wagering game causes the group event eligibility timer associated with the player's currently played gaming device to increment or increase.

For example, if the gaming system determines that the group event timer includes one-hundred-fifty-five seconds remaining (i.e., an amount of time greater than the first designated amount of zero seconds) and also determines that a group event eligibility timer for a gaming device has four seconds remaining (i.e., an amount of time greater than the second designated amount of zero seconds), the gaming system enables the player of that gaming device to place a wager on a group event wagering game. In this example, if the player places a wager of five credits on the group event wagering game and each credit wager on a group event wagering game increments the individual group event eligibility timer associated with that gaming device by one second, the gaming system increments that individual group event eligibility timer by five seconds (to result in a current amount of time of nine seconds). In this example, if the group event wagering game generates an outcome associated with an award of ten credits, the ten credits are provided to the player and the gaming system again determines if the player remains eligible to place another wager to play another group event wagering game (i.e., the gaming system determines if the group event timer includes an amount of time remaining greater than the first designated amount of zero seconds and then determines if the group event eligibility timer for the player's gaming device has an amount of time greater than the second designated amount of zero seconds).

In one embodiment, if the gaming system determines that the individual group event eligibility timer associated with a gaming device currently participating in the group event does not include an amount of time greater than the second designated amount of time (or an amount of time within a range of time relative to the second designated amount of time), the gaming system determines if the player has any accumulated group event elements as indicated in diamond 128. If the gaming system determines that the player does not have any accumulated group event elements, the gaming system eliminates that player from the triggered group event as indicated in block 130. On the other hand, if the gaming system determines that the player has at least one (or a designated quantity) of accumulated group event elements, then as described below, the gaming system provides the player of that gaming device a group event eligibility timer extension opportunity as indicated in block 132. In another embodiment, if the gaming system determines that the individual group event eligibility timer associated with a gaming device currently participating in the group event does not include an amount of time greater than the second designated amount of time, the gaming system eliminates that gaming device from the group event (i.e., the eliminated gaming device no longer participates in the triggered group event) and does not provide the player of that gaming device a group event eligibility timer extension opportunity. That is, in this embodiment, if the individual group event eligibility timer associated with a gaming device lapses before the expiration of the group event timer, that gaming device is eliminated from the group event. In this embodiment, if a gaming device is eliminated from the triggered group event, the gaming system adjusts each remaining player's relative portion of the group event award and displays such adjusted portion to each of the player's currently participating in the triggered group event.

In one embodiment, if the gaming system determines that the group event timer does not include an amount of time greater than the first designated amount of time (i.e., a group event terminating condition has occurred), the gaming system terminates the triggered group event as indicated in block 134 of FIG. 3. In this embodiment, upon the termination or conclusion of the triggered group event, as indicated in block 136, the gaming system provides a group event award to each player at each gaming device with an individual group event eligibility timer that includes an amount of time greater than the second designated amount of time. It should be appreciated that this embodiment is configured such that if a gaming device avoids being eliminated from the group event, the player of that gaming device is provided a group event award.

Figure 5B:
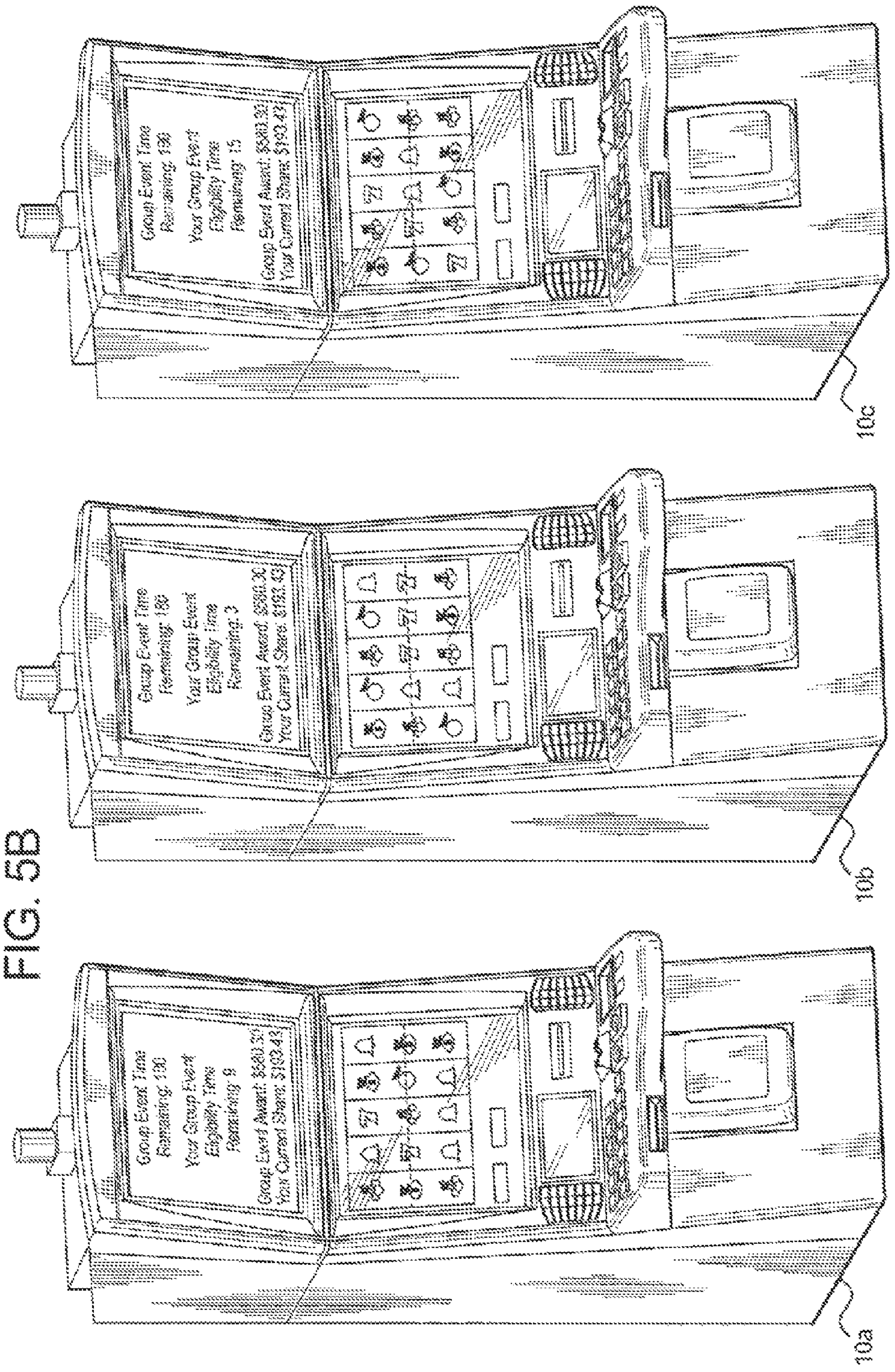

As described above, for one or more gaming devices currently or previously participating in the triggered group event, the gaming system displays, at different points in time, information or data regarding the amount of time remaining on group event timer, the amount of time remaining on the individual group event eligibility timer associated with that gaming device, the value of the group event award and the value of the portion of the group event award a player at that gaming device would win if that player remains participating in the group event. For example, as seen in FIG. 5B, at a second point in time during the group event, the group event timer has one-hundred-eighty seconds remaining, an individual group event eligibility timer for a first player at gaming device 10*a* has nine seconds remaining, an individual group event eligibility timer for a second player at gaming device 10*b* has three seconds remaining and an individual group event eligibility timer for a third player at gaming device 10*c* has fifteen seconds remaining. At this point in time, even though each individual group event eligibility timer initially had fifteen seconds and the triggered group event has been played for more than fifteen seconds, the players at the gaming devices currently participating in the triggered group event are each wagering at such rates (and time increments have been added to such timers) that the associated individual group event eligibility timers each currently include an amount of time above the second designated amount of time. At this point in time, since each of the gaming devices remain participating in the triggered group event, each gaming device's relative portion of the group event award remains unchanged.

Figure 5C:
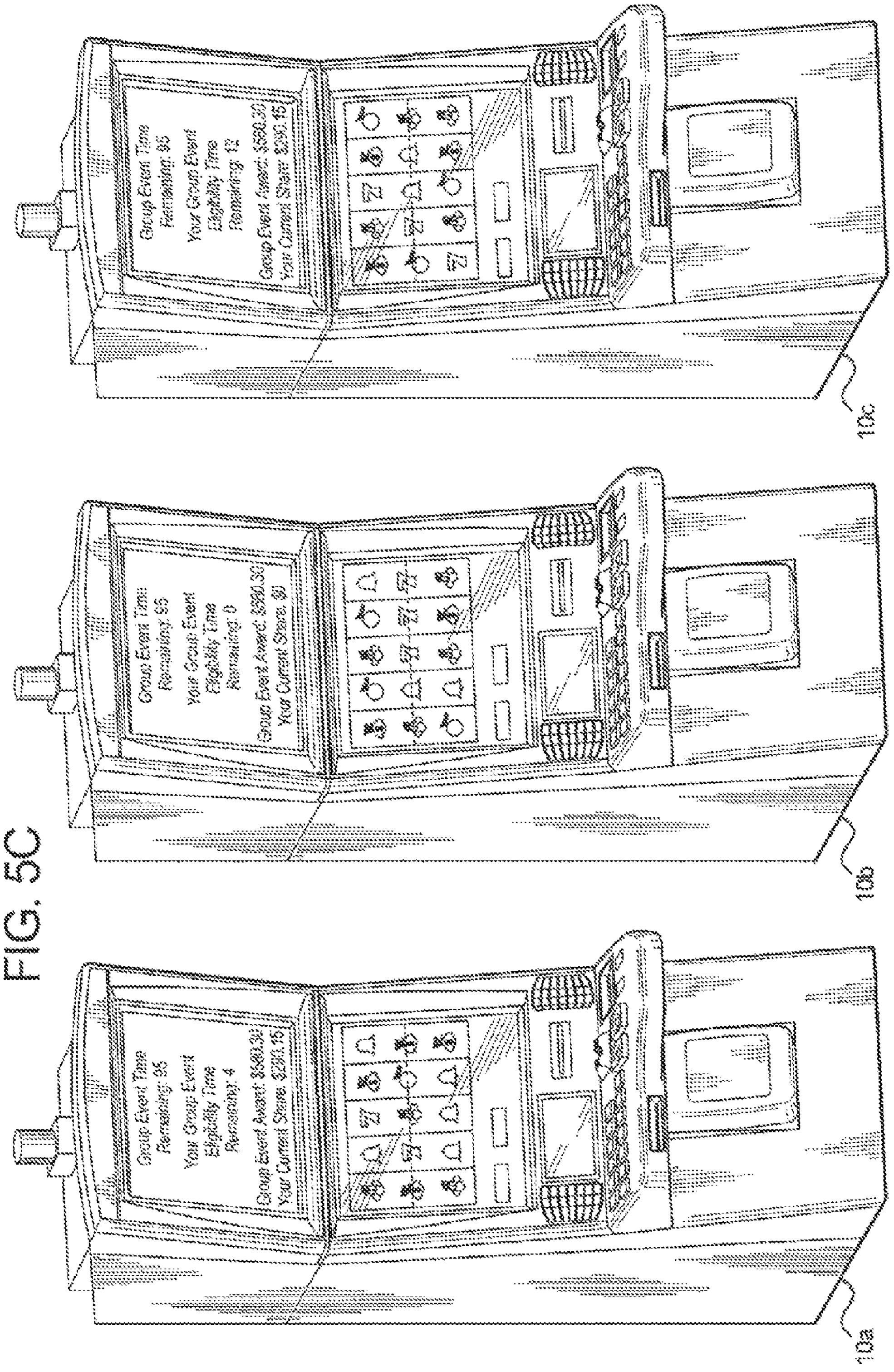

Continuing with the illustrated example, as seen in FIG. 5C, at a third point in time during the group event, the group event timer has ninety-five seconds remaining, the individual group event eligibility timer for the first player at gaming device 10*a* has four seconds remaining, the individual group event eligibility timer for the second player at gaming device 10*b* has zero seconds remaining and the individual group event eligibility timer for the third player at gaming device 10*c* has twelve seconds remaining. At this point in time, since the individual group event eligibility timer for gaming device 10*b* has zero time remaining, this gaming device is currently not participating in the triggered group event. Accordingly, at this point in time, since at least one of the gaming devices is no longer participating in the triggered group event, the gaming system modifies each gaming device's relative portion of the group event award and displays such modified portions. In one embodiment, this real-time display of the modified portions of the group event awards provides a significant aspect of the gaming system disclosed herein.

Figure 5D:
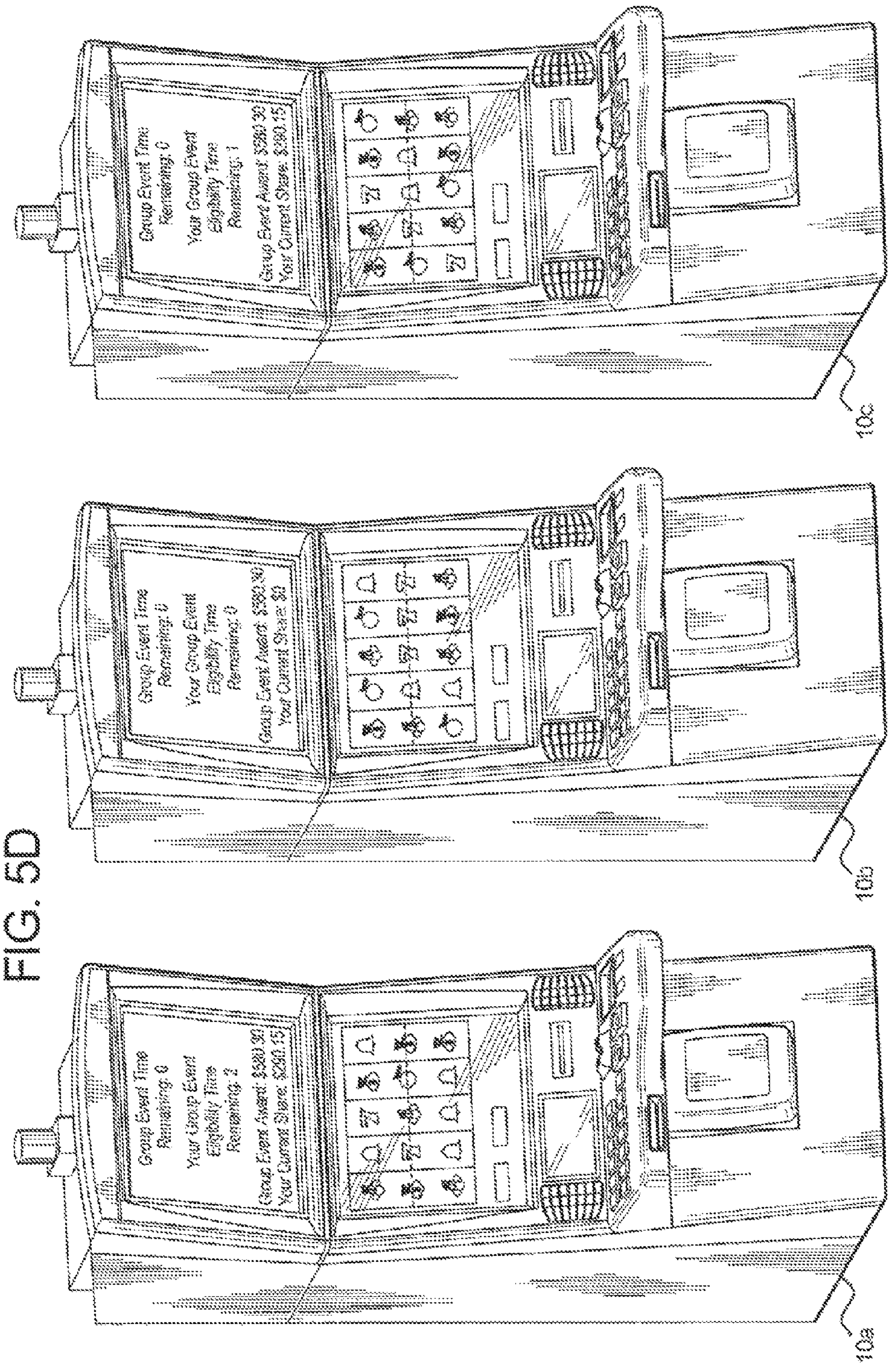

Continuing with the illustrated example, as seen in FIG. 5D, at a fourth point in time during the group event, the group event timer has zero seconds remaining (i.e., the triggered group event has concluded), the individual group event eligibility timer for the first player at gaming device 10*a* has two seconds remaining, the individual group event eligibility timer for the second player at gaming device 10*b* has zero seconds remaining and the individual group event eligibility timer for the third player at gaming device 10*c* has one second remaining. Accordingly, at this point in time, the gaming system provides the player at each gaming device that completed the group event with a relative portion of the group event award.

In one embodiment, as mentioned above, if the gaming system determines that the individual group event eligibility timer associated with a gaming device currently participating in the group event does not include an amount of time greater than the second designated amount of time (or within a range of time relative to the second designated amount of time), the gaming system provides the player of that gaming device a group event eligibility timer extension opportunity. If the player is unsuccessful in the group event eligibility timer extension opportunity, no amount of time is added to the individual group event eligibility timer of the player's currently played gaming device and the player is or remains eliminated from the triggered group event. In one such embodiment, if the player is unsuccessful in the group event eligibility timer extension opportunity (or is otherwise eliminated from the group event), the gaming system provides that player a consolation award. On the other hand, if the player is successful in the group event eligibility timer extension opportunity, an amount of time is added to the individual group event eligibility timer of the player's currently played gaming device. In one such embodiment, if the player is successful in the group event eligibility timer extension opportunity, the individual group event eligibility timer of the player's currently played gaming device is reset to an initial value (or other predetermined or randomly determined value).

In one embodiment, for a player participating in a group event eligibility timer extension opportunity, the gaming system determines a probability of success in the group event eligibility timer extension opportunity and determines if the player is successful in the group event eligibility timer extension opportunity based on this determined probability of success. In one such embodiment, the gaming system provides that a player's probability of success in the group event eligibility timer extension opportunity is greater than the player's probability of success in the group event eligibility sequence. Thus, this embodiment provides that a player currently participating in the group event has a greater chance of remaining participating in the group event than a player that is currently not participating in the group event to begin participation in the group event.

In another embodiment, for a player participating in a group event eligibility timer extension opportunity, the player's probability of success in the group event eligibility timer extension opportunity is based on that player's quantity of accumulated group event elements. That is, in this embodiment, the group event eligibility timer extension opportunity utilizes one or more of the accumulated group event elements described above. Accordingly, the player's previous gaming experience in accumulating group event elements determines the player's probability of continued participation in the triggered group event and thus determines, at least in part, the player's probability of winning at least part of a group event award. In other words, if a first player has accumulated a first quantity of group event elements, a second player has accumulated a greater, second quantity of group event elements and the individual group event eligibility timers for both the first player and the second player lapse, then the gaming system provides each of the players an opportunity to extend that players participation in the triggered group event (via increasing the amount of available time of each player's respective individual group event eligibility timer), wherein the second player has a greater probability (than the first player) of successfully extending their participation in the triggered group event. Moreover, if a first player has accumulated a first quantity of group event elements, a second player has accumulated a greater, second quantity of group event elements and the individual group event eligibility timers for both the first player and the second player lapse, then based on each player's quantity of accumulated group event elements, the gaming system provides the second player more opportunities to extend the second player's participation in the triggered group event than the first player.

In one embodiment, the gaming system utilizes one accumulated group event element in exchange for providing a player a group event eligibility timer extension opportunity. In this embodiment, each exchanged for group event element provides the player a designated amount of time to participate in the group event eligibility timer extension opportunity. In one such embodiment, if the player is unsuccessful in the group event eligibility timer extension opportunity during this designated amount of time, the gaming system requires the player to exchange another accumulated group event element for an additional amount of time to try and obtain a successful outcome in the group event eligibility timer extension opportunity. For example, if the individual group event eligibility timer associated with a gaming device currently participating in the group event does not include an amount of time greater than the second designated amount of time (or within a range of time relative to the second designated amount of time) and the player has accumulated five bonus event elements, the gaming system enables the player to exchange one of these bonus event elements for fifteen seconds to participate in a group event eligibility time extension opportunity.

In one embodiment, if the player is provided an amount of time to participate in the group event eligibility time extension opportunity and the player is successful in the group event eligibility time extension opportunity, the amount of time added to the player's individual group event eligibility timer is based on the amount of time the player takes to succeed in the group event eligibility time extension opportunity. In one such embodiment, if the player is provided an amount of time to participate in the group event eligibility time extension opportunity and the player is successful in the group event eligibility time extension opportunity, the amount of time the player takes to succeed in the group event eligibility time extension opportunity is reduced from that player's individual group event eligibility timer.

In one embodiment, each of a quantity of accumulated group event elements (such as a quantity of one) provides a separate determination of whether or not the player is successful in the group event eligibility timer extension opportunity. In one such embodiment, for an accumulated group event element, the gaming system automatically determines whether or not the player is successful in the group event eligibility timer extension opportunity. In this embodiment, if the determination is that the player is successful, an amount of time is added to the individual group event eligibility timer associated with that player's gaming device and the player continues participating in the triggered group event. On the other hand, if the determination is that the player is unsuccessful and the player has at least another accumulated group event element, the gaming system automatically determines, for that other accumulated group event element, whether or not the player is successful in the group event eligibility timer extension opportunity as described above. Moreover, if the determination is that the player is unsuccessful and the player does not have any accumulated group event elements, that player is eliminated from the triggered group event.

In another such embodiment, the group event eligibility timer extension opportunity includes enabling the player to select, one at a time, each of the player's accumulated group event elements. In this embodiment, if a player selects an accumulated group event element, that selected group event element is removed and a random determination (of whether to prolong the player's eligibility in the group event) occurs. If the result of the random determination is to prolong the player's eligibility in the triggered group event, an amount of time is added to the individual group event eligibility timer associated with that player's gaming device and the player continues participating in the triggered group event. If the result of the random determination is not to prolong the player's eligibility in the triggered group event and the player has at least another group event element, the gaming system enables the player to select another group event element and another random determination occurs as described above. If the result of the random determination is not to prolong the player's eligibility in the triggered group event and the player does not have any accumulated group event elements remaining, the gaming system determines that the player is unsuccessful in the group event eligibility timer extension opportunity and eliminates the player from the triggered group event. In one embodiment, such group event eligibility timer extension opportunities occur for the player when the individual group event eligibility timer associated with that player's gaming device includes an amount of time greater than the second designated amount of time and within a range of time relative to this second designated amount of time. For example, if the individual group event eligibility timer associated with that player's gaming device includes three seconds remaining (i.e., an amount of time greater than a second designated amount of time of zero seconds and within a range of zero to five seconds relative to the second designated amount of time), such an automatic determination occurs.

In one embodiment, if a player is eliminated from the triggered group event (either based on a determination that the individual group event eligibility timer associated with a gaming device currently participating in the group event does not include an amount of time greater than the second designated amount of time or based on a determination that the player is unsuccessful in the group event eligibility timer extension opportunity), the gaming system enables the player to begin accumulating group event elements to be utilized for a subsequent triggered group event. In another embodiment, if a player is eliminated from the triggered group event, the gaming system enables the player to accumulate group event elements to be utilized if that player reenters the triggered group event (as described below).

Figure 4D:
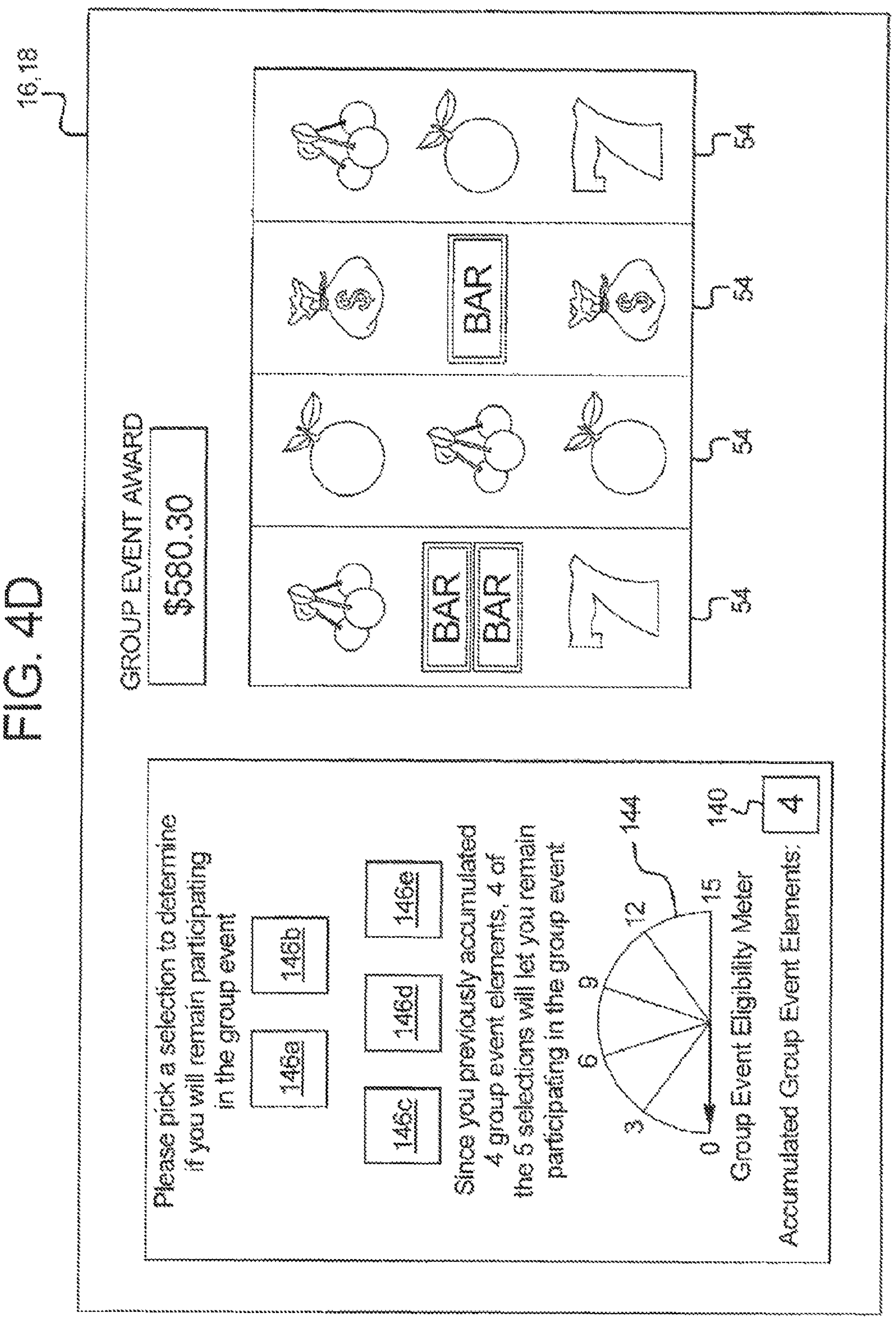

In another embodiment, the player's quantity of accumulated group event elements determine the player's probability of success in the group event eligibility timer extension opportunity. For example, after the individual group event eligibility timer for a gaming device has decreased to the second designated amount of time (or within a range relative to the second designated amount of time), the gaming system provides the player an opportunity to extend the individual group event eligibility timer associated with the player's currently played gaming device via a selection game. In this example, as seen in FIG. 4D, if a player has accumulated four group event elements and the group event eligibility sequence is provided via enabling the player to pick one of five selections 145A to 146*e* (wherein each accumulated group event is associated with a separate selection), then the player's probability of success in the group event eligibility timer extension opportunity is 80% (or 4/5). In this example, appropriate messages such as "PLEASE PICK A SELECTION TO DETERMINE IF YOU WILL REMAIN PARTICIPATING IN THE GROUP EVENT" and "SINCE YOU PREVIOUSLY ACCUMULATED 4 GROUP EVENT ELEMENTS, 4 OF THE 5 SELECTIONS WILL LET YOU REMAIN PARTICIPATING IN THE GROUP EVENT" may be provided to the player visually, or through suitable audio or audiovisual displays. It should be appreciated that other suitable success/failure methods can be employed to determine if the player is successful or not in the group event eligibility timer extension opportunity.

Figure 6:
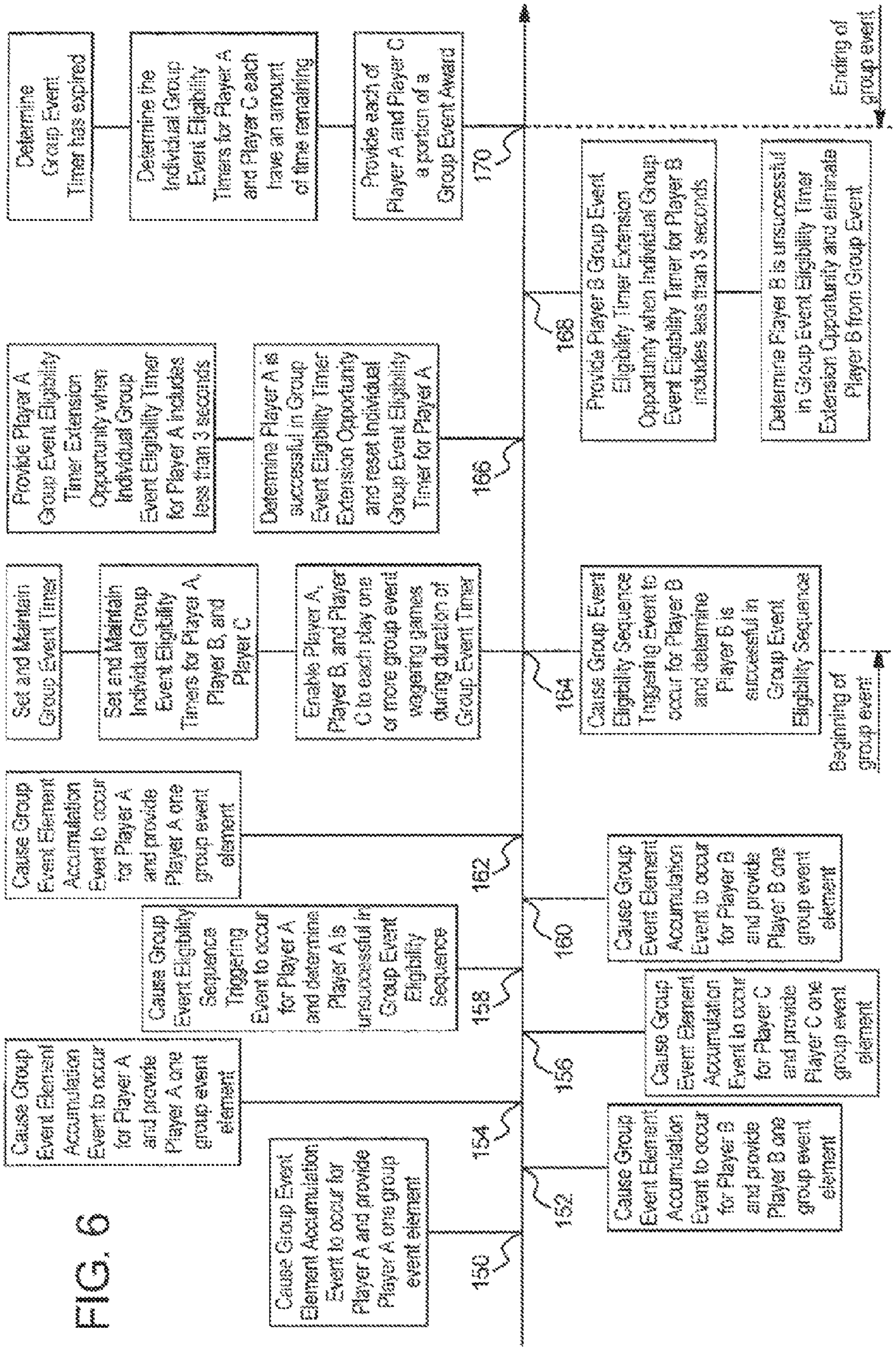
FIG. 6 is a timeline of the operation of one embodiment of the gaming system disclosed herein illustrating a triggered group event for a plurality of gaming devices that concludes upon the expiration of the group event timer.

In operation of one example of one embodiment of the gaming system disclosed herein, at different points in time, the gaming system causes different events to occur which determine, at least in part, if that player will win at least part of a group event award in any triggered group event. In one such embodiment, at different points in time, the gaming system causes group event accumulation events to occur for different players at different gaming devices and provides such players group event elements. For example, as seen in FIG. 6, at points in time 150, 154 and 162, the gaming system causes group event element accumulation events to occur for Player A and provides Player A one group event element for each such occurrence. As also seen in FIG. 6, at points in time 152 and 160, the gaming system causes group event element accumulation events to occur for Player B and provides Player B one group event element for each such occurrence. Additionally, in this example, at point in time 156, the gaming system causes a group event element accumulation event to occur for Player C and provides Player C one group event element for such an occurrence.

Such group event accumulation events occur until the gaming system determines that a group event eligibility sequence triggering event has occurred. Following the above example illustrated in FIG. 6, at point in time 158, the gaming system causes a group event eligibility sequence triggering event to occur for Player A and determines that Player A is unsuccessful in the group event eligibility sequence. Accordingly, no group event is triggered and the gaming system continues providing players group event elements upon occurrences of group event element accumulation events. For example, after Player A was unsuccessful in the group event eligibility sequence, at point in time 160, the gaming system causes a group event element accumulation event to occur for Player B and provides Player B one group event element for such an occurrence.

In this illustrated embodiment, the gaming system continues causing group event accumulation events to occur until point in time 164 when the gaming system causes a group event eligibility sequence triggering event to occur for Player B and determines that Player B is successful in the group event eligibility sequence. In this example, a group event is thus triggered for Player A, Player B and Player C because each of such players are determined eligible to participate in the triggered group event. At this point in time, the gaming system also sets the group event timer, sets and maintains an individual group event timer for Player A, Player B and Player C and enables such players at such gaming devices to each play one or more group event wagering games during the duration of the group event.

In this illustrated embodiment, upon triggering the group event, the gaming system enables each player currently participating in the triggered group event to play one or more group event wagering games and monitors for a group event eligibility timer associated with one of the currently played gaming devices to include less than a designated amount of time.

In this example, at point in time 166, upon determining that the individual group event eligibility timer for Player A is less than the designated amount of time of three seconds, the gaming system provides Player A a group event eligibility timer extension opportunity. At this point in time, the gaming system determines that Player A is successful in the group event eligibility timer extension opportunity and thus the gaming system resets the group event eligibility timer for Player A. In this example, since Player A was successful in the group event eligibility timer extension opportunity, Player A remains participating in the triggered group event.

In this example, at another point in time 168, upon determining that the individual group event eligibility timer for Player B is less than the designated amount of time of three seconds, the gaming system provides Player B a group event eligibility timer extension opportunity. At this point in time, the gaming system determines that Player B is unsuccessful in the group event eligibility timer extension opportunity and thus the gaming system eliminates Player B from participating in the triggered group event.

In this illustrated embodiment, the gaming system proceeds as described above until the gaming system determines that the group event timer has expired. Upon the expiration of the group event timer (i.e., a group event terminating condition has occurred), the gaming system determines which players at which gaming devices remain participating in the triggered group event and provides such players a portion of a group event award. For example, as seen in FIG. 6, at point in time 170, upon the expiration of the group event timer, the gaming system determines that Player A and Player C remain participating in the triggered group event (i.e., the individual group event eligibility timers for Player A and Player C each have an amount of time remaining) and thus the gaming system provides a portion of a group event award to Player A and Player C.

In one embodiment, the portion of the group event award provided to each player is based, at least in part, on the amount of time remaining for each player's individual group event eligibility timer. Following the above-described example, if the individual group event eligibility timer for Player A has twice the amount of time remaining as the individual group event eligibility timer for Player C, then Player A's portion of the group event award is twice as large as Player C's portion of the group event award. In different embodiments, the portion of the group event award provided to each player at each gaming device which remained participating in the triggered group event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system maintains a plurality of group event awards, such as a plurality of progressive awards, wherein which group event award provided to a player (at a gaming device which remained participating in the triggered group event) is based on the amount of time remaining for that player's individual group event eligibility timer. For example, a first player at a first gaming device with an individual group event eligibility timer having a first amount of time remaining (upon the occurrence of the group event terminating condition) is provided part or all of a first bonus event award and a second player at a second gaming device with an individual group event eligibility timer having a second, greater amount of time remaining (upon the occurrence of the group event terminating condition) is provided part or all of a second, greater bonus event award. In one such embodiment, as the amount of time of an individual group event eligibility timer is changing during the triggered group event, the gaming system is configured to display to a player, in real-time, which particular bonus event award the player is currently playing for based on the amount of time remaining for that player's individual group event eligibility timer.

In another embodiment, in addition to concluding the triggered group event when the group event timer reaches the first designated amount of time, the gaming system is configured to also conclude the triggered group event upon a group event terminating condition occurring. In one such embodiment, the group event terminating condition is the generation of a designated game outcome (or other game event occurring). That is, as the triggered group event of this embodiment may conclude before the group event meter has expired (i.e., if the group event terminating condition occurs), the amount of time of the group event represents the maximum amount of time the triggered group event will last.

In another embodiment, rather than concluding the triggered group event when either the group event timer reaches the first designated amount of time or a group event terminating condition occurs, the gaming system does not maintain a group event timer and concludes the group event when a group event terminating condition occurs. In this embodiment, if the individual group event eligibility timer associated with a gaming device lapses before a group event terminating condition occurs, that gaming device is eliminated from the group event. In one such embodiment, the group event terminating condition is the generation of a designated game outcome (or other game event occurring). That is, in this embodiment, the gaming system requires a player to sustain an individual group event eligibility timer above a certain level until a group event terminating condition occurs to win a portion of a group event award.

Figure 7:
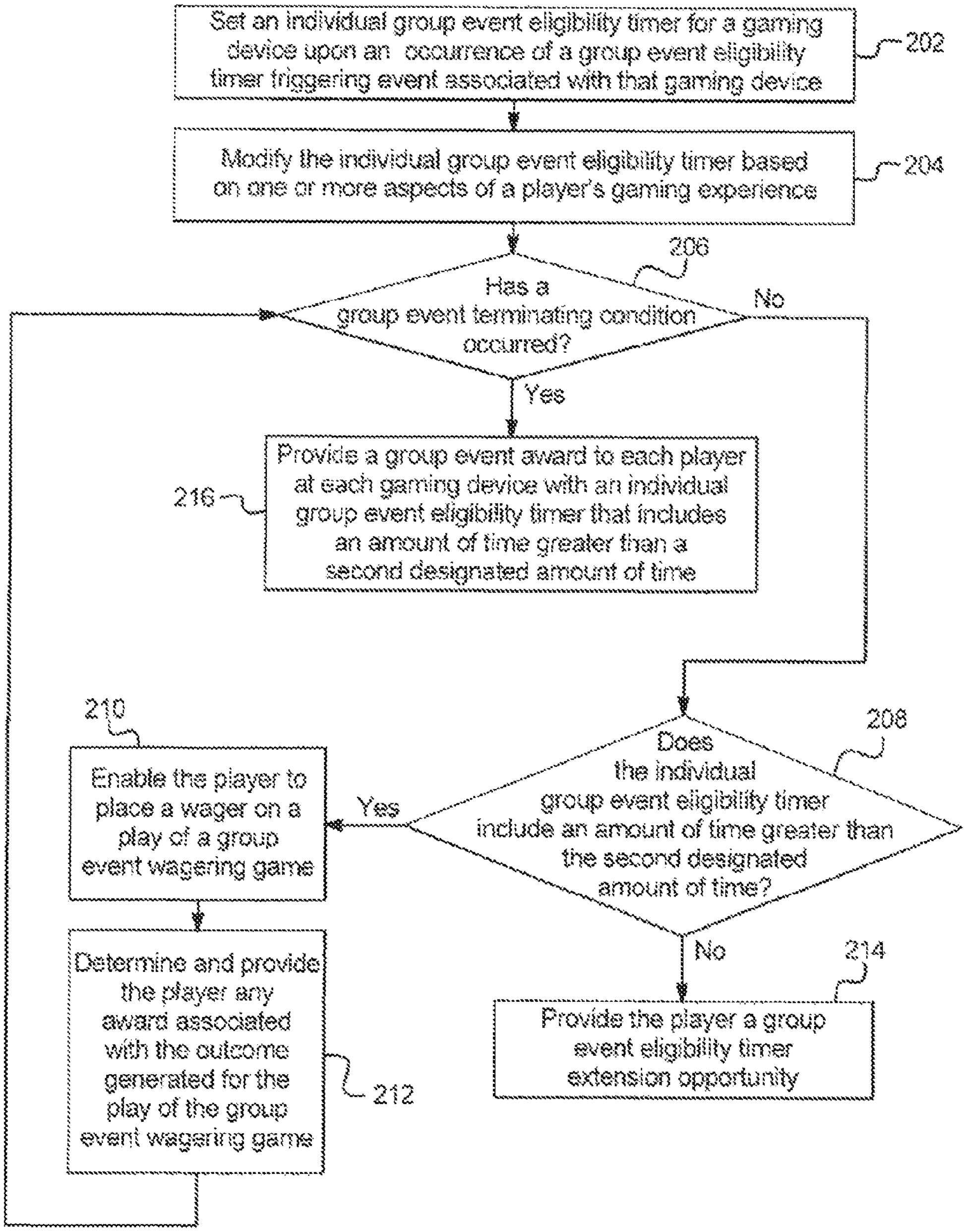
FIG. 7 is a flow-chart of an alternative embodiment of the gaming system disclosed herein illustrating a triggered group event for an individual gaming device that concludes upon a group event terminating condition.

In one embodiment, as indicated in block 202 of FIG. 7, upon an occurrence of a group event eligibility timer triggering event, the gaming system sets an individual group event eligibility timer for the gaming device associated with the occurrence of the group event eligibility timer triggering event. In this embodiment, the group event is triggered for each gaming device individually and not for a group of gaming devices. That is, although a plurality of gaming devices may each be simultaneously participating in the group event, such gaming device's gain entry into the group event individually and not collectively as a group.

In one embodiment, a group event eligibility timer triggering event occurs based on a player's wagering history or coin-in. In another embodiment, a group event eligibility timer triggering event occurs based on time. In another embodiment, a group event eligibility timer triggering event occurs based on a displayed event in a play of one or more displayed games of one or more of the gaming devices in the gaming system. In another embodiment, a group event eligibility timer triggering event occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether a group event eligibility timer triggering event has occurred. In another embodiment, the gaming system defines one or more game play parameters, wherein each time a player's tracked game play activity satisfies the defined parameter, the group event eligibility timer triggering event occurs.

After setting the individual group event eligibility timer, as described above, the gaming system modifies such an individual group event eligibility timer based on one or more aspects of a player's gaming experience as indicated in block 204. The gaming system then determines if a group event terminating condition occurs as indicated in diamond 206. In one embodiment, a group event terminating condition occurs based on a displayed event in a play of one or more displayed games of one or more of the gaming devices in the gaming system.

In one such embodiment, the gaming system determines if a designated game outcome is generated in association with a group event wagering game played at a gaming device currently participating in the group event. In another such embodiment, the gaming system determines if a designated game outcome is generated in association with a group event wagering game played at a gaming device currently participating in the group event and in association with a primary game played at a gaming device not currently participating in the group event. In another embodiment, a group event terminating condition occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether a group event terminating condition has occurred. In another embodiment, the gaming system defines one or more game play parameters, wherein each time a player's tracked game play activity satisfies the defined parameter, the group event terminating condition occurs.

As seen in FIG. 7, if the group event terminating condition has not occurred, as indicated in diamond 208 and described above, the gaming system determines if the individual group event eligibility timer associated with the gaming device includes an amount of time greater than a second designated amount of time. That is, the gaming system determines if the gaming device remains eligible to participate in the triggered group event. If the gaming system determines that the individual group event eligibility timer associated with the gaming device includes an amount of time greater than the second designated amount of time, as described above, the gaming system enables the player to place a wager on a play of a group event wagering game as indicated in block 210. In this embodiment, the gaming system determines and provides the player any award associated with the outcome generated for the play of the group event wagering game as indicated in block 212. After providing the player any award associated with the outcome generated for the play of the group event wagering game, the gaming system returns to diamond 206 and again determines if a group event terminating condition has occurred.

In one embodiment, if the gaming system determines that the individual group event eligibility timer associated with the gaming device does not include an amount of time greater than the second designated amount of time, as described below, the gaming system provides the player of that gaming device a group event eligibility timer extension opportunity as indicated in block 214. In one embodiment, if the gaming system determines that the group event terminating condition has occurred as indicated in block 216, the gaming system provides a group event award to each player at each gaming device with an individual group event eligibility timer that includes an amount of time greater than the second designated amount of time. That is, if a gaming device avoids being eliminated from the group event before the occurrence of the group event triggering condition, the player of that gaming device is provided a group event award. For example, if the group event terminating condition is the generation of a symbol combination associated with a progressive award, upon any of the gaming devices generated a symbol combination associated with the progressive award, the gaming system concludes the group event and provides each player currently participating in the group event with a portion of the group event award.

It should be appreciated that while this embodiment does not include the above-described steps of: (i) providing a player one or more group event elements upon an occurrence of a group event element accumulation event, (ii) monitoring for an occurrence of a group event eligibility sequence triggering event, (iii) providing a group event eligibility sequence to a player, or (iv) determining if a player is successful in the group event eligibility sequence, one or more of these above-described steps may be incorporated in this embodiment. For example, the embodiment illustrated in FIG. 7 may additionally include providing a player a group event eligibility sequence to determine if the player will participate in the group event.

Figure 8:
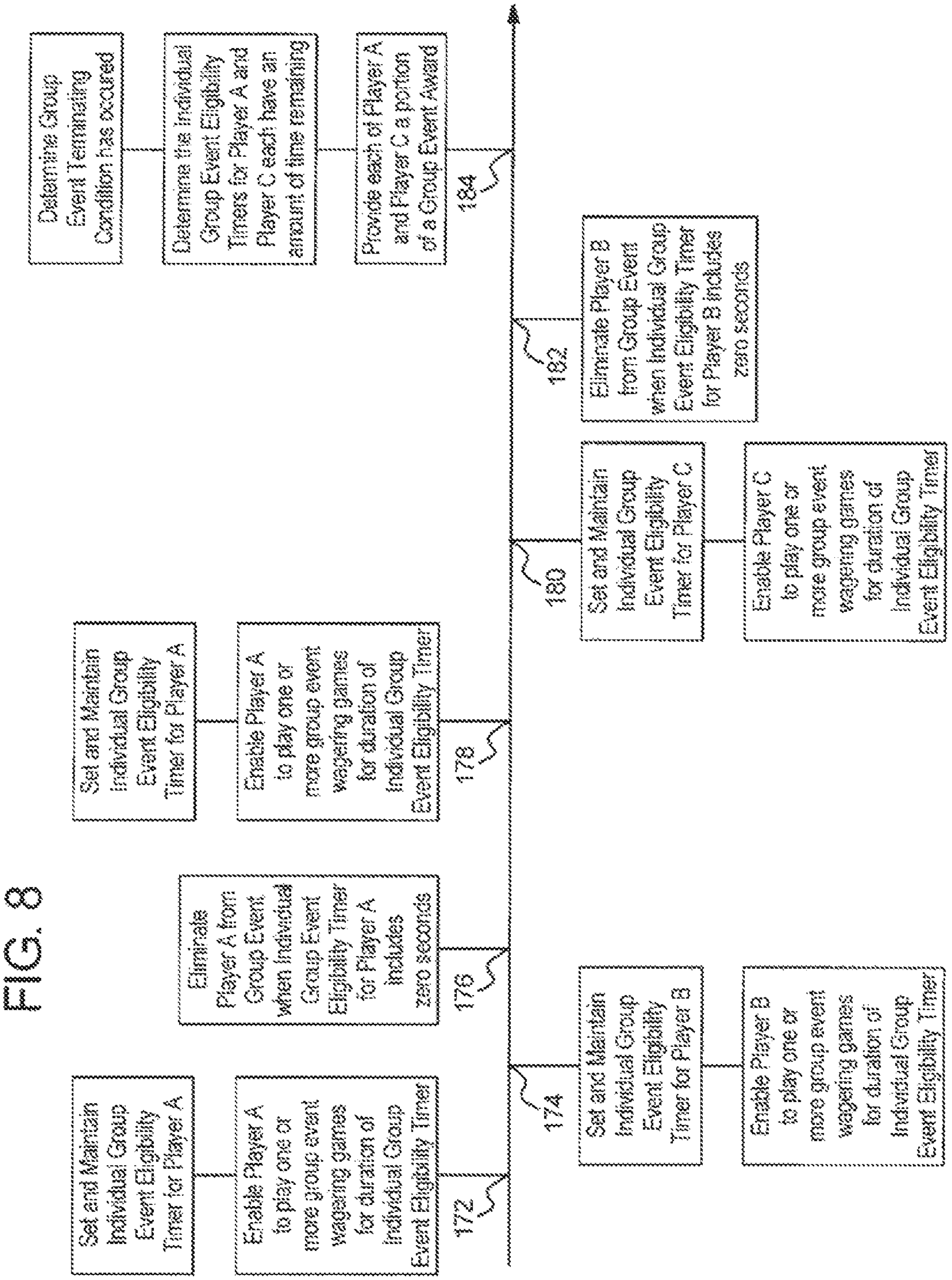
FIG. 8 is a timeline of the operation of one embodiment of the gaming system disclosed herein illustrating a triggered group event for an individual gaming device that concludes upon a group event terminating condition.

In operation of one example of this embodiment of the gaming system disclosed herein, at different points in time, the gaming system: (i) enables certain players at certain gaming devices to participate in a group event and play for a group event award and (ii) eliminates certain players at certain gaming devices from participating in the group event and playing for the group event award. In this embodiment, upon an occurrence of a group event terminating condition, the gaming system provides part or all of a group event award to each player currently participating in the group event. As seen in FIG. 8, at a first point in time 172, a group event eligibility timer triggering event occurs in association with Player A (at a first gaming device). At this first point in time, the gaming system sets and maintains an individual group event timer for Player A and enables Player A to play one or more group event wagering games during the duration of the individual group event eligibility timer for Player A. It should be appreciated that as described above, Player A's wagering activity on such group event wagering games determines, at least in part, the duration of the individual group event eligibility timer for Player A.

In this example, at a second point in time 174, a group event eligibility timer triggering event occurs in association with Player B (at a second gaming device). At this second point in time, the gaming system sets and maintains an individual group event timer for Player B and enables Player B to play one or more group event wagering games during the duration of the individual group event eligibility timer for Player B. It should be appreciated that as described above, Player B's wagering activity on such group event wagering games determines, at least in part, the duration of the individual group event eligibility timer for Player B.

At another point in time 176 of this example, the gaming system determines that the individual group event eligibility timer for Player A includes zero seconds (i.e., an amount of time less than the second designated amount of time) and the gaming system eliminates Player A from the current group event. That is, the gaming system determines that Player A's wagering activity did not adequately increment the individual group event eligibility timer for Player A (compared to the regular decrements of the individual group event eligibility timer for Player A) to sustain the individual group event eligibility timer for Player A at or above a designated amount of time. In one embodiment (not shown), if the individual group event eligibility timer for a player falls below a designated amount of time (or within a range of time based on the designated amount of time), the gaming system provides that player a group event eligibility timer extension opportunity as described above.

At point in time 178 of this example, another group event eligibility timer triggering event occurs in association with Player A (at the first gaming device). At this point in time, the gaming system again sets and maintains another individual group event timer for Player A and enables Player A to play one or more group event wagering games during the duration of the individual group event eligibility timer for Player A. Accordingly, this example illustrates that a player may be provided a plurality of individual group event eligibility timers while playing for one group event award.

In this example, at another point in time 180, a group event eligibility timer triggering event occurs in association with Player C (at a third gaming device). At this point in time, the gaming system sets and maintains an individual group event timer for Player C and enables Player C to play one or more group event wagering games during the duration of the individual group event eligibility timer for Player C. It should be appreciated that as described above, Player C's wagering activity on such group event wagering games determines, at least in part, the duration of the individual group event eligibility timer for Player C.

At another point in time 182 of this example, the gaming system determines that the individual group event eligibility timer for Player B includes zero seconds (i.e., an amount of time less than the second designated amount of time) and the gaming system eliminates Player B from the current group event. Subsequent to the elimination of Player B from playing for the group event award, at point in time 184, the gaming system determines that a group event terminating condition has occurred.

Upon the occurrence of the group event terminating condition, the gaming system determines which players at which gaming devices remain playing for the group event award (i.e., which players are playing at which gaming devices associated with pending individual group event eligibility timers) and provides such players a portion of a group event award. For example, as seen in FIG. 8, at point in time 184, the gaming system determines that Player A and Player C remain playing for the group event award (i.e., the individual group event eligibility timers for Player A and Player C each have an amount of time remaining) and thus the gaming system provides a portion of a group event award to Player A and Player C. Accordingly, this example embodiment illustrates that different players may be participating in the group event at different points in time and which players are provided a portion of the group event award is based on which players are currently participating in the group event upon the conclusion or termination of the group event.

In another embodiment, if a player at a gaming device currently in an individual group event eligibility timer does not sustain a designated level of play, that gaming device is eliminated from the group event. In this embodiment, regardless of the amount of time remaining on the individual group event timer associated with the gaming device a player is currently playing, if the player's level of play (i.e., an amount wagered per a designated period of time) falls below the designated level of play, that gaming device is eliminated from the triggered group event. For example, if the designated level of play is wagering five credits per minute of game play and a player at a gaming device associated with a group event eligibility timer with ten seconds remaining does not sustain this designated level of play, that gaming device is eliminated from the triggered group event.

In another embodiment, the gaming system concludes the group event when a designated quantity of players remain participating in the triggered group event (i.e., the occurrence of a group event terminating condition). In one such embodiment, the designated quantity of players is one player, such that the last player remaining in the triggered group event (i.e., the last player at a gaming device having a pending group event eligibility timer) is provided the group event award. In one such embodiment, if a quantity of players greater than one remain participating in the triggered group event, the gaming system enables such players to split the group event award or proceed in the triggered group event to determine which one of these players will be the last player remaining in the triggered group event. In another such embodiment, the designated quantity of players is more than one player, such that a last quantity of players remaining in the triggered group event are provided part or all of the group event award.

In one embodiment, a group event element accumulation event occurs during a player's play of a primary wagering game. In another embodiment, a group event element accumulation event occurs during a player's play of a primary wagering game or during a player's play of a wagering game of a triggered group event. In this embodiment, the gaming system enables a player to accumulate group event elements during the player's participation in the triggered group event wherein such accumulated group event elements may prolong the player's participation in the triggered group event (and thus increase the player's probability of winning part or all of a group event award).

In another embodiment, a group event element accumulation event additionally/alternatively occurs if a player wagers at least a designated amount over a designated amount of time (i.e., the player is playing at at least a certain rate). For example, if a player maintains a wagering rate of twenty-five credits wagered per minute for five minutes, the gaming system causes a group event element accumulation event to occur and provides the player a quantity of group event elements. In another embodiment, a group event element accumulation event occurs based on a displayed event in a play of one or more displayed games of one or more of the gaming devices in the gaming system. In another embodiment, a group event element accumulation event occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether a group event element accumulation event has occurred. In another embodiment, the gaming system defines one or more game play parameters, wherein each time a player's tracked game play activity satisfies the defined parameter, the group event element accumulation event occurs. In different embodiments, the determination of whether a group event element accumulation event occurs for a player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, upon the occurrence of a group event element accumulation event, each player is provided the same quantity of group event elements. In another embodiment, upon the occurrence of a group event element accumulation event, different players are provided different quantities of group event elements. In one embodiment, the same player is provided different quantities of group event elements upon the occurrences of different group event element accumulation events. In different embodiments, upon the occurrence of a group event element accumulation event, the quantity of group event elements provided to a player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, if a group event element accumulation event occurs, the gaming system accumulates one or more group event elements (and maintains such accumulated group event elements) for the specific player at the gaming device associated with the group event element accumulation event. In this embodiment, such accumulated group event elements are associated with the player and may be transferred from gaming device to gaming device. In another embodiment, if a group event element accumulation event occurs, the gaming system accumulates one or more group event elements (and maintains such accumulated group event elements) for the gaming device associated with the group event element accumulation event. In this embodiment, such accumulated group event elements are associated with the gaming device and independent of which player may be playing the gaming device at any given point in time.

In another embodiment, the gaming system enables one or more players to buy one or more accumulated group event elements. In one such embodiment, a player buys one or more accumulated group event elements using an amount of credits. In another embodiment, a player buys one or more accumulated group event elements using an amount of player tracking points. In another embodiment, a player buys one or more accumulated group event elements using an amount of promotional credits.

In another embodiment, one or more accumulated group event elements are associated with an expiration date and time. In this embodiment, the gaming system is configured to communicate to the player the proximity of the expiration of any accumulated group event elements (i.e., "your group event elements will expire at 6:00 am tomorrow"). In one embodiment, such notice of expiration of any accumulated group event elements is at the player's currently played gaming device. In another embodiment, such notice of expiration of any accumulated group event elements is external from the player's currently played gaming device, such as via e-mail. In different embodiments, if multiple group event elements are accumulated in associated with a player's account, the use of accumulated stored group event elements are provided to the player in order of expiration (first to expire shows first), in order of first earned basis.

In one embodiment, if a group event eligibility sequence triggering event occurs, the gaming system pauses the player's currently played primary game and enables the player to play the group event eligibility sequence. In another embodiment, if a group event eligibility sequence triggering event occurs, the gaming system enables the player to play the group event eligibility sequence simultaneous with or substantially simultaneous with the player's currently played primary game.

In one embodiment, for a player participating in a group event eligibility sequence, the player's probability of success in the group event eligibility sequence is partially based on that player's quantity of accumulated group event elements and partially based on one or more other determinations. In another embodiment, for a player participating in a group event eligibility sequence, the player's probability of success in the group event eligibility sequence is independent of that player's quantity of accumulated group event elements. In different embodiments, a player's probability of success in the group event eligibility sequence is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, if the player is successful in the group event eligibility sequence, the gaming system triggers a group event for each player of at least a designated player tracking status. In another embodiment, if the player is successful in the group event eligibility sequence, the gaming system triggers a group event for each player with a wagering activity history that meets a threshold of wagering activity history. In another embodiment, a plurality of players are enabled to form a group of players and if one of the players in the formed group of players is successful in the group event eligibility sequence, the gaming system triggers a group event for each of the players in the formed group of players. In another embodiment, the gaming system forms one or more groups of players and if one of the players in a formed group of players is successful in the group event eligibility sequence, the gaming system triggers a group event for each of the players in that formed group of players. In this embodiment, the gaming system forms such groups of players based on any suitable criteria. In different embodiments, if a player is successful in the group event eligibility sequence, the determination of which players at which gaming devices participate in the group event is predetermined, randomly determined, determined based on each player's status (such as determined through a player tracking system), determined based on one or more generated symbols or symbol combinations, determined based on one or more random determinations by the central controller, determined based on one or more random determinations at one or more of the gaming machines, determined based on one or more side wagers placed, determined based on each player's primary game wager, determined based on time (such as the time of day), determined based on an amount of coin-in accumulated in one or more pools or determined based on any other suitable method or criteria.

In one embodiment, for different triggered group events, the gaming system sets the group event timer to different initial amounts of time. In another embodiment, for different triggered group events, the gaming system sets the group event timer to the same initial amount of time. In different embodiments, the initial amount of time of the group event time (i.e., the maximum amount of time the group event mode will run) is predetermined, randomly determined, determined based on one or more player's statuses (such as determined through a player tracking system), determined based on a generated symbol or symbol combination, determined based on a random determination by the central controller, determined based on a random determination at a gaming machine, determined based on one or more side wagers placed, determined based on a player's primary game wager, determined based on time (such as the time of day), determined based on an amount of coin-in accumulated in one or more pools or determined based on any other suitable method or criteria.

In one embodiment, for different triggered group events, the gaming system modifies (i.e., counts down) the group event timer in the same intervals. In another embodiment, for different triggered group events, the gaming system modifies (i.e., counts down) the group event timer in different intervals. In different embodiments, the intervals by which the group event timer are modified is predetermined, randomly determined, determined based on one or more player's statuses (such as determined through a player tracking system), determined based on a generated symbol or symbol combination, determined based on a random determination by the central controller, determined based on a random determination at a gaming machine, determined based on one or more side wagers placed, determined based on a player's primary game wager, determined based on time (such as the time of day), determined based on an amount of coin-in accumulated in one or more pools or determined based on any other suitable method or criteria.

In one embodiment, the gaming system sets an individual group event eligibility timer to the same amount for each gaming device participating in the triggered group event. In another embodiment, the gaming system sets the individual group event eligibility timers to different amounts for different gaming devices participating in the triggered group event. In one embodiment, the gaming system sets an individual group event eligibility timer or meter for a gaming device participating in the triggered group event based on the wagering activity of the player at that gaming device. For example, a player wagering a first amount is provided an individual group event eligibility timer with a greater amount of initial time than a player wagering a second, lower amount. In another embodiment, the gaming system sets an individual group event eligibility timer or meter for a gaming device participating in the triggered group event based on the wagering activity of the player at that gaming device during a period of time prior to the triggering of the group event. In another embodiment, the gaming system sets an individual group event eligibility timer or meter for a gaming device participating in the triggered group event based on the player status of the player at that gaming device. For example, a player of a first player tracking status is provided an individual group event eligibility timer with a greater amount of initial time than a second player of a lower player tracking status. In different embodiments, the initial amount of time for each group event eligibility time is predetermined, randomly determined, determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system decreases each individual group event eligibility timer (for each gaming device participating in the triggered group event) by the same increment amount at the same rate. In one embodiment, the gaming system decreases different individual group event eligibility timers (for different gaming devices participating in the triggered group event) by different increment amounts at different rates. In different embodiments, for each group event eligibility timer, the increment amount that group event eligibility timer decreases and/or the rate at which that group event eligibility timer decreases is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, if a player at a gaming device wins a wagering game and is provided an award, that gaming device's individual group event eligibility timer is paused (or is otherwise unmodified), during the period of time which the credit meter increments to reflect this provided award. In another embodiment, if a player at a gaming device wins a wagering game and is provided an award, then if an individual group event eligibility timer decrease event occurs during the period of time which the credit meter increments to reflect this provided award, that gaming device's individual group event eligibility timer is decremented accordingly. In this embodiment, if an individual group event eligibility timer increase event occurs during the period of time which the credit meter increments to reflect this provided award, that gaming device's individual group event eligibility timer is increased accordingly.

In one embodiment, the gaming system increases each individual group event eligibility timer (for each gaming device participating in the triggered group event) by the same increment amount at the same rate. In one embodiment, the gaming system increases different individual group event eligibility timers (for different gaming devices participating in the triggered group event) by different increment amounts at different rates. In different embodiments, for each group event eligibility timer, the increment amount that group event eligibility timer increases and/or the rate at which that group event eligibility timer increases is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, if the gaming system determines that the individual group event eligibility timer associated with a gaming device currently participating in the group event does not include an amount of time greater than the second designated amount of time, the gaming system provides the player of that gaming device a group event timer extension opportunity, wherein the player's probability of success in the group event timer extension opportunity is greater than the player's probability of success in any previous group event eligibility sequence. In different embodiments, if the gaming system determines that the individual group event eligibility timer associated with a gaming device currently participating in the group event does not include an amount of time greater than the second designated amount of time, the determination of whether or not to provide the player of that gaming device a group event timer extension opportunity is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. In different embodiments, if the player is successful in the group event eligibility timer extension opportunity, the amount of time added to the individual group event eligibility timer of the player's currently played gaming device is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system maintains a plurality of group event awards, such as progressive awards. In this embodiment, the gaming system enables a player to select which one of the plurality of group event awards the player will play for during the triggered bonus event. As described above, as different players that selected to play for one of the group event awards are eliminated from the triggered group event, for each remaining player that also selected to play for that group event award, the value of that remaining player's relative portion of the selected group event award is determined and displayed to that player.

It should be appreciated that any suitable primary wagering game may be incorporated as the group event wagering game played during the triggered group event of the gaming system disclosed herein. In different embodiments, the group event wagering game may incorporate any of the types of wagering games described herein, as well as any suitable puzzle-type game, any suitable persistence game, any suitable wheel game, any suitable selection game, any suitable offer and acceptance game, any suitable cascading symbols game, any suitable ways to win game, any suitable scatter pay game, any suitable group game or any other suitable type of game. In different embodiments, the type of game utilized for the wagering games of the triggered group event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. In different embodiments, the characteristics or features of each wagering game of the triggered group event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

In one embodiment, any suitable paytable may be utilized for the group event wagering games played during the triggered group event. In one such embodiment, the same paytable that is used for the primary games described above is utilized for the group event wagering games played during the triggered group event. In another such embodiment, a different paytable than the paytable utilized for the primary games described above is utilized for the group event wagering games played during the triggered group event. In different embodiments, which paytable is utilized for the wagering games of the triggered group event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

It should be appreciated that any suitable game may be incorporated as the group event eligibility sequence or the group event eligibility timer extension opportunity of the gaming system disclosed herein. In different embodiments, the group event eligibility sequence or the group event eligibility timer extension opportunity may incorporate any of the types of primary or secondary games described herein, as well as any suitable puzzle-type game, any suitable persistence game, any suitable wheel game, any suitable selection game, any suitable offer and acceptance game, any suitable cascading symbols game, any suitable ways to win game, any suitable scatter pay game, any suitable group game or any other suitable type of game. In different embodiments, the characteristics or features of each group event eligibility sequence and/or each group event eligibility timer extension opportunity is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

In different embodiments of the gaming system disclosed herein, (i) a group event element accumulation event occurs, (ii) a group event eligibility sequence triggering event occurs, (iii) a group event eligibility timer triggering event occurs, (iv) a group event eligibility timer increase event occurs, (v) a group event eligibility timer decrease event occurs, and/or (vi) a group event terminating condition occurs based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In different embodiments of the gaming system disclosed herein, (i) a group event element accumulation event occurs, (ii) a group event eligibility sequence triggering event occurs, (iii) a group event eligibility timer triggering event occurs, (iv) a group event eligibility timer increase event occurs, (v) a group event eligibility timer decrease event occurs, and/or (vi) a group event terminating condition occurs based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In different embodiments of the gaming system disclosed herein, (i) a group event element accumulation event occurs, (ii) a group event eligibility sequence triggering event occurs, (iii) a group event eligibility timer triggering event occurs, (iv) a group event eligibility timer increase event occurs, (v) a group event eligibility timer decrease event occurs, and/or (vi) a group event terminating condition occurs based on a predefined variable reaching a defined parameter threshold. For example, when the 500,000$^{th}$ player has played a gaming machine of the gaming system (ascertained from a player tracking system), one or more of such events or conditions occur. In different embodiments, the predefined parameter thresholds include a length of time, a length of time after a certain dollar amount is hit, a wager level threshold for a specific machine (which gaming device is the first to contribute $250,000), a number of gaming machines active, or any other parameter that defines a suitable threshold.

In different embodiments of the gaming system disclosed herein, (i) a group event element accumulation event occurs, (ii) a group event eligibility sequence triggering event occurs, (iii) a group event eligibility timer triggering event occurs, (iv) a group event eligibility timer increase event occurs, (v) a group event eligibility timer decrease event occurs, and/or (vi) a group event terminating condition occurs based on time. In this embodiment, a time is set for when one or more of such events or conditions will occur. In one embodiment, such a set time is based on historic data.

In different embodiments of the gaming system disclosed herein, (i) a group event element accumulation event occurs, (ii) a group event eligibility sequence triggering event occurs, (iii) a group event eligibility timer triggering event occurs, (iv) a group event eligibility timer increase event occurs, (v) a group event eligibility timer decrease event occurs, and/or (vi) a group event terminating condition occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts or otherwise associates their player tracking card in the gaming machine. The central server/gaming device processor determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments of the gaming system disclosed herein, (i) a group event element accumulation event occurs, (ii) a group event eligibility sequence triggering event occurs, (iii) a group event eligibility timer triggering event occurs, (iv) a group event eligibility timer increase event occurs, (v) a group event eligibility timer decrease event occurs, and/or (vi) a group event terminating condition occurs based on a system determination, including one or more random selections by the central controller. In one embodiment, as described above, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. In one such embodiment, based on the gaming machine's state as well as one or more wager pools associated with the gaming machine, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments of the gaming system disclosed herein, (i) a group event element accumulation event occurs, (ii) a group event eligibility sequence triggering event occurs, (iii) a group event eligibility timer triggering event occurs, (iv) a group event eligibility timer increase event occurs, (v) a group event eligibility timer decrease event occurs, and/or (vi) a group event terminating condition occurs based on a determination of if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing one or more group event elements to be provided may be implemented in accordance with the gaming system and method disclosed herein.

In one embodiment, rather than setting the group event timer and/or one or more individual group event eligibility timers at an initial amount of time and counting down to zero (or another designated amount of time remaining), the gaming system sets the group event timer and/or one or more individual group event eligibility timers at an amount of zero and counts up to a designated amount of time.

In another embodiment, the group bonus event award is at least partially funded via an amount provided by one or more marketing and/or advertising departments, such as a casino's marketing department. In another embodiment, the group bonus event award is at least partially funded via a sponsor or advertiser. In this embodiment, in return for sponsoring the group event, one or more gaming devices enrolled in the group event display advertisements for the sponsor. In one such embodiment, depending on a player's gaming experience during the group event, the gaming system provides different advertisements to the player.

In another embodiment, the gaming system enables a player to reserve a gaming device to play during a triggered group event. In one embodiment, such a reservation occurs prior to the occurrence of the group event. In another embodiment, such a reservation occurs during the group event.

In another embodiment, the gaming system disclosed herein provides one or more group event tournaments. In such an embodiment, the central controller enables one or more players to participate in a group event tournament wherein each wagering game played in association with the group event tournament includes a minimum wager amount and/or other game play requirements. For example, the central controller enables a group event tournament on a designated number of gaming devices for a designated number of players wherein each gaming device is initially provided a quantity of group event elements as described above.

In another embodiment, different accumulated group event elements have different features or characteristics. In one such embodiment, one or more accumulated group event elements provide the player that accumulated such group event element an advantage for one or more wagering games played during the group event (i.e., a modified of one or more wagering game awards). In another such embodiment, one or more accumulated group event elements provide the player that accumulated such group event element an increased amount of time for that player's group event eligibility timer. In different embodiment, the features or characteristics associated with one or more accumulated group event element is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

In another embodiment, if a player is eliminated from a group event, the gaming system provides the player a quantity of group event elements. In this embodiment, such post-elimination group event elements may be utilized during a subsequently played group event (or exchanged for a low-level award). In different embodiments, the quantity of group event elements are issued as a ticket, associated with the player tracking system for a player or associated with a player account maintained by the gaming system. In different embodiments, the quantity of post-elimination group event elements is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

Information Provided to Player

As indicated above, the group event element accumulation events, the group event eligibility sequence triggering events, the group event eligibility timer triggering events, the group event eligibility timer increase events, the group event eligibility timer decrease events and/or the group event terminating conditions may be provided to the players of the gaming machines with or without explanation or information provided to the player, or alternatively information can be displayed to the player. In one embodiment, suitable information about these events or conditions can be provided to the players through one or more displays on the gaming machines or additional information displays positioned near the gaming machines, such as above a bank of system gaming machines.

This information can be used to entertain the player or inform the player that one or more of such events or conditions has occurred or will occur. Examples of such information, include, but are not limited to:

(1) that a group event element accumulation event, a group event eligibility sequence triggering event, a group event eligibility timer triggering event, a group event eligibility timer increase event, a group event eligibility timer decrease event, and/or a group event terminating condition has occurred;

(2) that a group event element accumulation event, a group event eligibility sequence triggering event, a group event eligibility timer triggering event, a group event eligibility timer increase event, a group event eligibility timer decrease event, and/or a group event terminating condition will shortly occur;

(3) the amount of time remaining in the triggered group event;

(4) the amount of time each gaming device remains eligible to participate in the triggered group event;

(5) that one or more group event elements and/or group event awards have been provided to one or more players;

(6) which gaming machines have won the group event elements or group event awards;

(7) the amount of the provided group event elements or group event awards;

(8) the highest group event award or quantity of group event elements provided;

(9) the lowest group event award or quantity of group event elements provided;

(10) the average group event award or quantity of group event elements provided;

(11) number of games played/total time since the last group event award or quantity of group event elements were provided;

(12) the average time between group event awards or quantity of group event elements being provided;

(13) the number of group event awards or group event elements provided in a designated time period; and

(14) the amount of the group event awards or quantities of group event elements that can be provided.

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming devices, at least one of the gaming devices including:

a housing, a plurality of input devices supported by the housing, said plurality of input devices including an acceptor, and a cashout device, at least one processor, and at least one memory device which stores a plurality of instructions which, when executed by the at least one processor, cause the at least one processor to:
responsive to a physical item being received via the acceptor, establish a credit balance based, at least in part, on a monetary value associated with the received physical item,
receive at least one wager placed on at least one game, and
responsive to a cashout input being received via the cashout device, cause an initiation of any payout associated with the credit balance;
at least one display device associated with at least one of said gaming devices; and
at least one controller configured to:
determine if a group event triggering condition occurs in association with one of the gaming devices;
responsive to the determination being that the group event triggering condition occurs for one of the gaming devices, trigger the group event for at least two of the gaming devices; and
thereafter, select one of said at least two of the gaming devices to cause to provide a group event award to a player of said gaming device, wherein each gaming device of said at least two of the gaming devices has a greater than zero probability of being selected that is determined, at least in part, based on:
any wagers placed at said gaming device during a designated period of time prior to the trigger of the group event, and
any wagers placed at said gaming device during the triggered group event, wherein:
a first amount of wagers placed at said gaming device during the designated period of time prior to the trigger of the group event and a first amount of wagers placed at said gaming device during the triggered group event is associated with a first probability of being selected, and
the first amount of wagers placed at said gaming device during the designated period of time prior to the trigger of the group event and a second, greater amount of wagers placed at said gaming device during the triggered group event is associated with a second, greater probability of being selected.

2. A method of operating a gaming system, said method comprising:
causing at least one processor to execute a plurality of instructions to determine if a group event triggering condition occurs in association with one of a plurality of gaming devices, wherein for at least one of the gaming devices: (i) responsive to a physical item being received via an acceptor, a credit balance is established, said credit balance based, at least in part, on a monetary value associated with the received physical item, and (ii) responsive to a cashout input being received via a cashout device, an initiation is caused of any payout associated with the credit balance;
responsive to the determination being that the group event triggering condition occurs for one of the gaming devices, causing the at least one processor to execute the plurality of instructions to trigger the group event for at least two of the gaming devices; and
thereafter, causing the at least one processor to execute the plurality of instructions to select one of said at least two of the gaming devices to cause to provide a group event award to a player of said gaming device, wherein each gaming device of said at least two of the gaming devices has a greater than zero probability of being selected that is determined, at least in part, based on:
any wagers placed at said gaming device during a designated period of time prior to the trigger of the group event, and
any wagers placed at said gaming device during the triggered group event, wherein:
a first amount of wagers placed at said gaming device during the designated period of time prior to the trigger of the group event and a first amount of wagers placed at said gaming device during the triggered group event is associated with a first probability of being selected, and
the first amount of wagers placed at said gaming device during the designated period of time prior to the trigger of the group event and a second, greater amount of wagers placed at said gaming device during the triggered group event is associated with a second, greater probability of being selected.

3. The method of claim 2, which is provided through a data network.

4. The method of claim 3, wherein the data network is an internet.

5. A gaming system comprising:
a processor, and
a memory device which stores a plurality of instructions which, when executed by the processor, cause the processor to:
determine if a group event triggering condition occurs in association with one of a plurality of mobile devices;
responsive to the determination being that the group event triggering condition occurs for one of the mobile devices, trigger the group event for at least two of the plurality of mobile devices; and
thereafter, select one of said at least two of the mobile devices to cause a display of a group event award, wherein each mobile device of said at least two of the mobile devices has a greater than zero probability of being selected that is determined, at least in part, based on:
any wagers placed via said mobile device during a designated period of time prior to the trigger of the group event, and
any wagers placed via said mobile device during the triggered group event, wherein:
a first amount of wagers placed via said mobile device during the designated period of time prior to the trigger of the group event and a first amount of wagers placed via said mobile device during the triggered group event is associated with a first probability of being selected, and
the first amount of wagers placed via said mobile device during the designated period of time prior to the trigger of the group event and a second, greater amount of wagers placed via said mobile device during the triggered group event is associated with a second, greater probability of being selected.

6. The gaming system of claim 5, wherein when executed by the processor, the plurality of instructions cause the processor to communicate with the mobile device over a wireless network.

7. A method of operating a gaming system, said method comprising:

causing a processor to execute a plurality of instructions to determine if a group event triggering condition occurs in association with one of a plurality of mobile devices, wherein for at least one of the mobile devices;

responsive to the determination being that the group event triggering condition occurs for one of the mobile devices, causing the processor to execute the plurality of instructions to trigger the group event for at least two of the mobile devices; and thereafter, causing the processor to execute the plurality of instructions to select one of said at least two of the mobile devices to cause a display, by said selected mobile device, of a group event award, wherein each mobile device of said at least two of the mobile devices has a greater than zero probability of being selected that is determined, at least in part, based on:

any wagers placed via said mobile device during a designated period of time prior to the trigger of the group event, and any wagers placed via said mobile device during the triggered group event, wherein:

a first amount of wagers placed via said mobile device during the designated period of time prior to the trigger of the group event and a first amount of wagers placed via said mobile device during the triggered group event is associated with a first probability of being selected, and the first amount of wagers placed via said mobile device during the designated period of time prior to the trigger of the group event and a second, greater amount of wagers placed via said mobile device during the triggered group event is associated with a second, greater probability of being selected.

8. The method of claim 7, further comprising causing the processor to communicate with the mobile device over a wireless network.

9. The method of claim 7, which is provided through a data network.

10. The method of claim 9, wherein the data network is an internet.

* * * * *